Aug. 6, 1929.  N. WHITE ET AL  1,723,263
MECHANICAL CASHIER, ADDING, AND LISTING MACHINE
Filed June 7, 1912    17 Sheets-Sheet 1

WITNESSES:
C.H.Wagner.
G.W.Kirkley

INVENTOR.
Nelson White
W.S. Overlin
BY F.A.Bullington
J.H.Robb ATTORNEY.

Aug. 6, 1929.   N. WHITE ET AL   1,723,263
MECHANICAL CASHIER, ADDING, AND LISTING MACHINE
Filed June 7, 1912   17 Sheets-Sheet 3

WITNESSES

INVENTORS
Nelson White
W. S. Overton
F. A. Bullington
BY
ATTORNEY

Aug. 6, 1929.　　　N. WHITE ET AL　　　1,723,263
MECHANICAL CASHIER, ADDING, AND LISTING MACHINE
Filed June 7, 1912　　　17 Sheets-Sheet 4

Witnesses
C.H.Wagner,
G.W.Kirkley

Inventors
Nelson White
W.S.Overlin
F.H.Bullington
By
J.H.Robb
Attorney

Aug. 6, 1929.   N. WHITE ET AL   1,723,263
MECHANICAL CASHIER, ADDING, AND LISTING MACHINE
Filed June 7, 1912   17 Sheets-Sheet 6

Witnesses
Lett Wagner
G. W. Kirkley

Inventors
Nelson White
W. S. Overlin
F. A. Bullington
By
J. F. Robb
Attorney

Aug. 6, 1929.   N. WHITE ET AL   1,723,263
MECHANICAL CASHIER, ADDING, AND LISTING MACHINE
Filed June 7, 1912   17 Sheets-Sheet 7

Inventors
Nelson White
W. S. Overlin
F. A. Bullington

Attorney

Aug. 6, 1929.   N. WHITE ET AL   1,723,263
MECHANICAL CASHIER, ADDING, AND LISTING MACHINE
Filed June 7, 1912   17 Sheets-Sheet 8
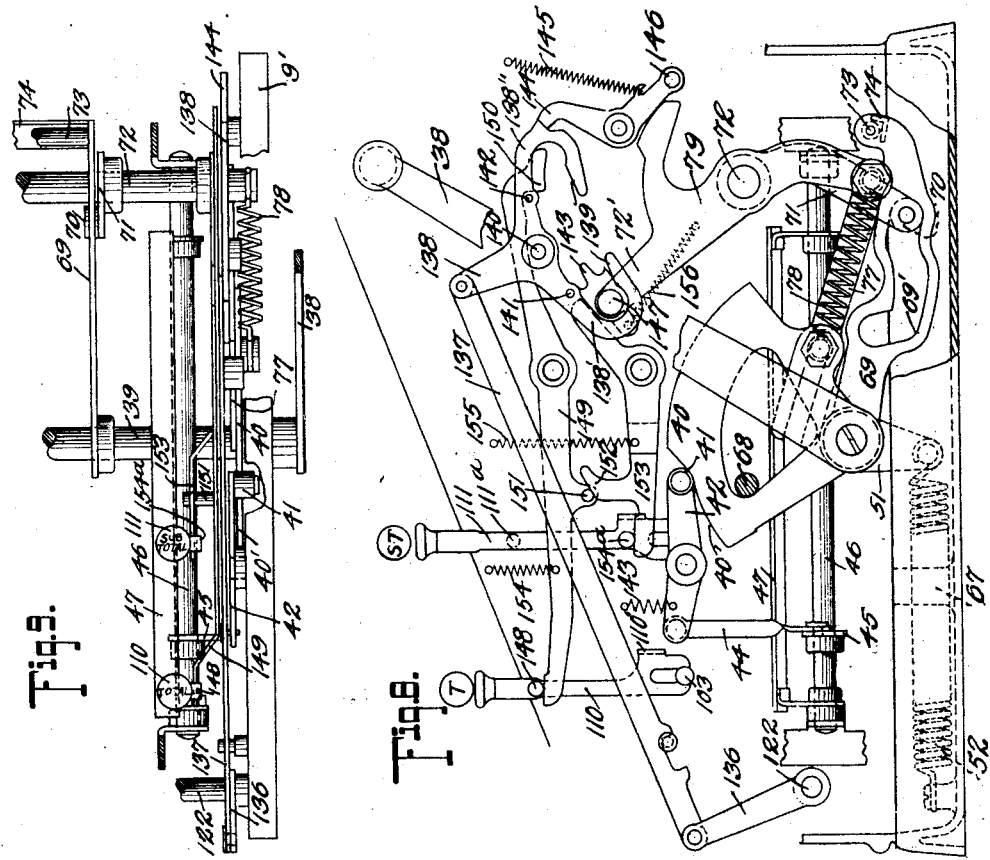
Witnesses
Inventors
Nelson White
W. S. Overlin
F. A. Bullington
Attorney

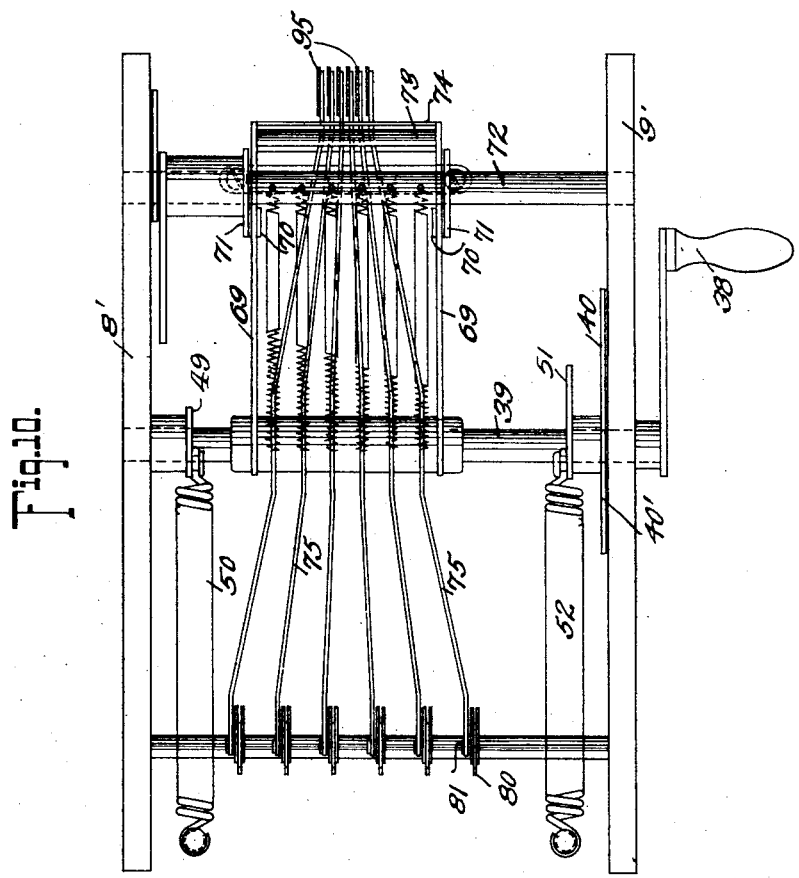

Aug. 6, 1929.    N. WHITE ET AL    1,723,263
MECHANICAL CASHIER, ADDING, AND LISTING MACHINE
Filed June 7, 1912    17 Sheets-Sheet 10
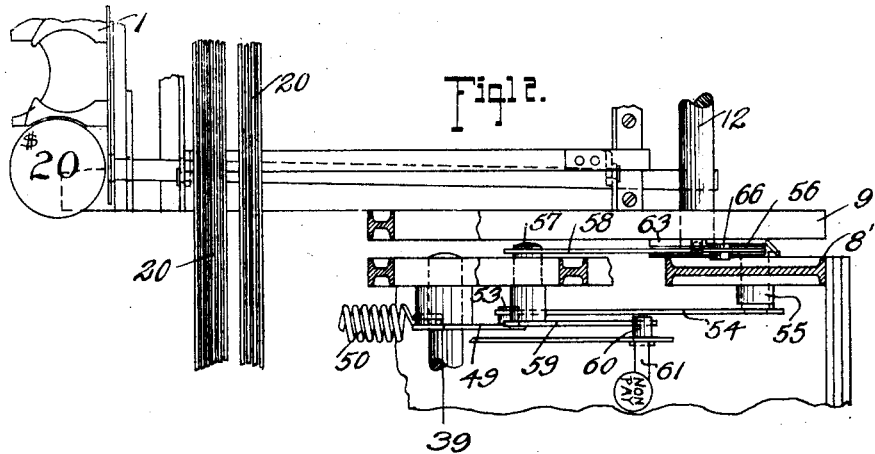
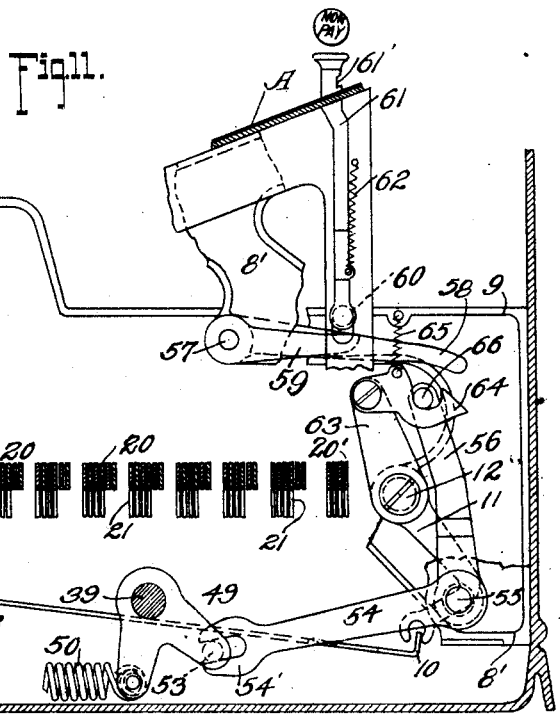

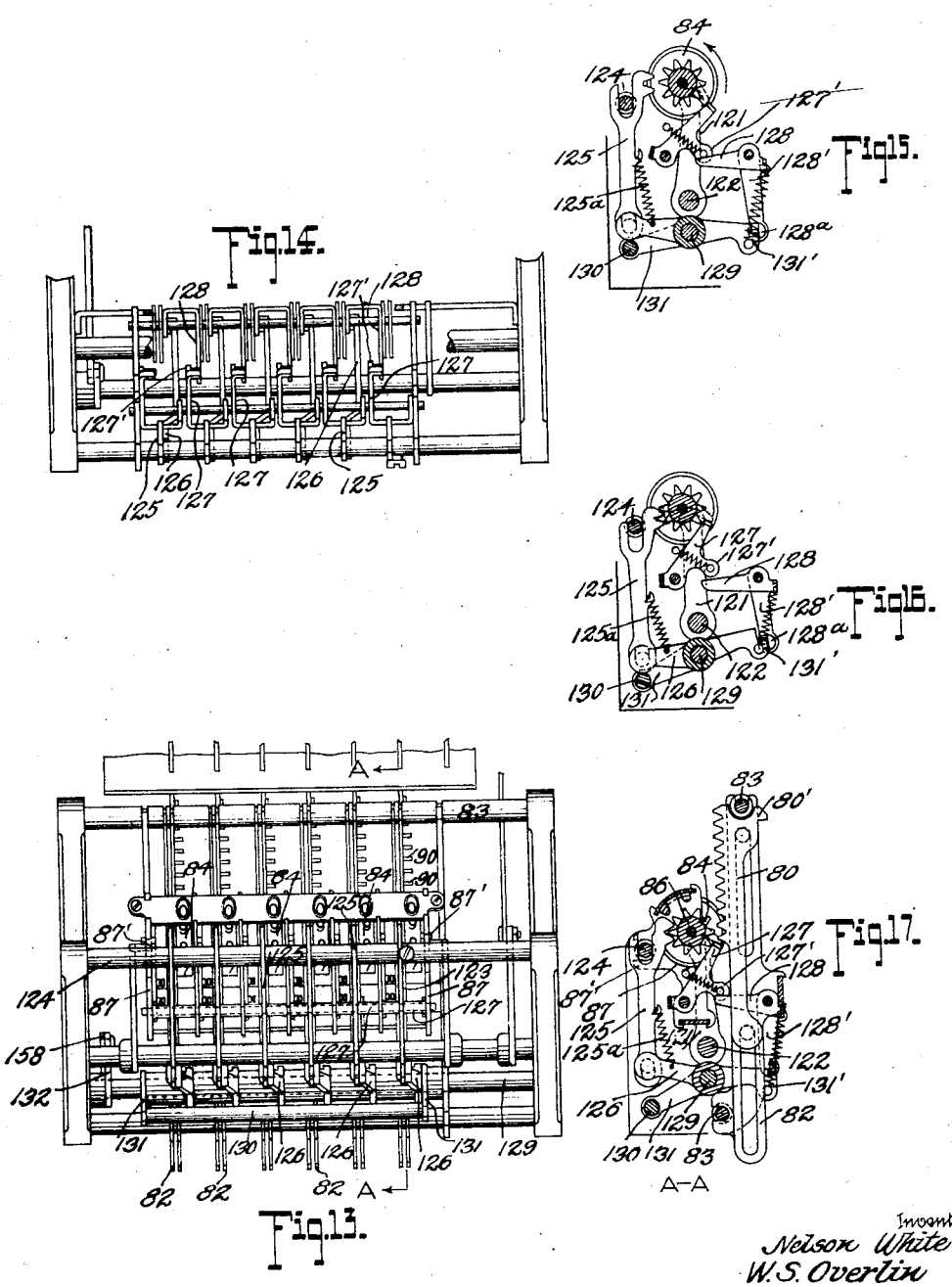

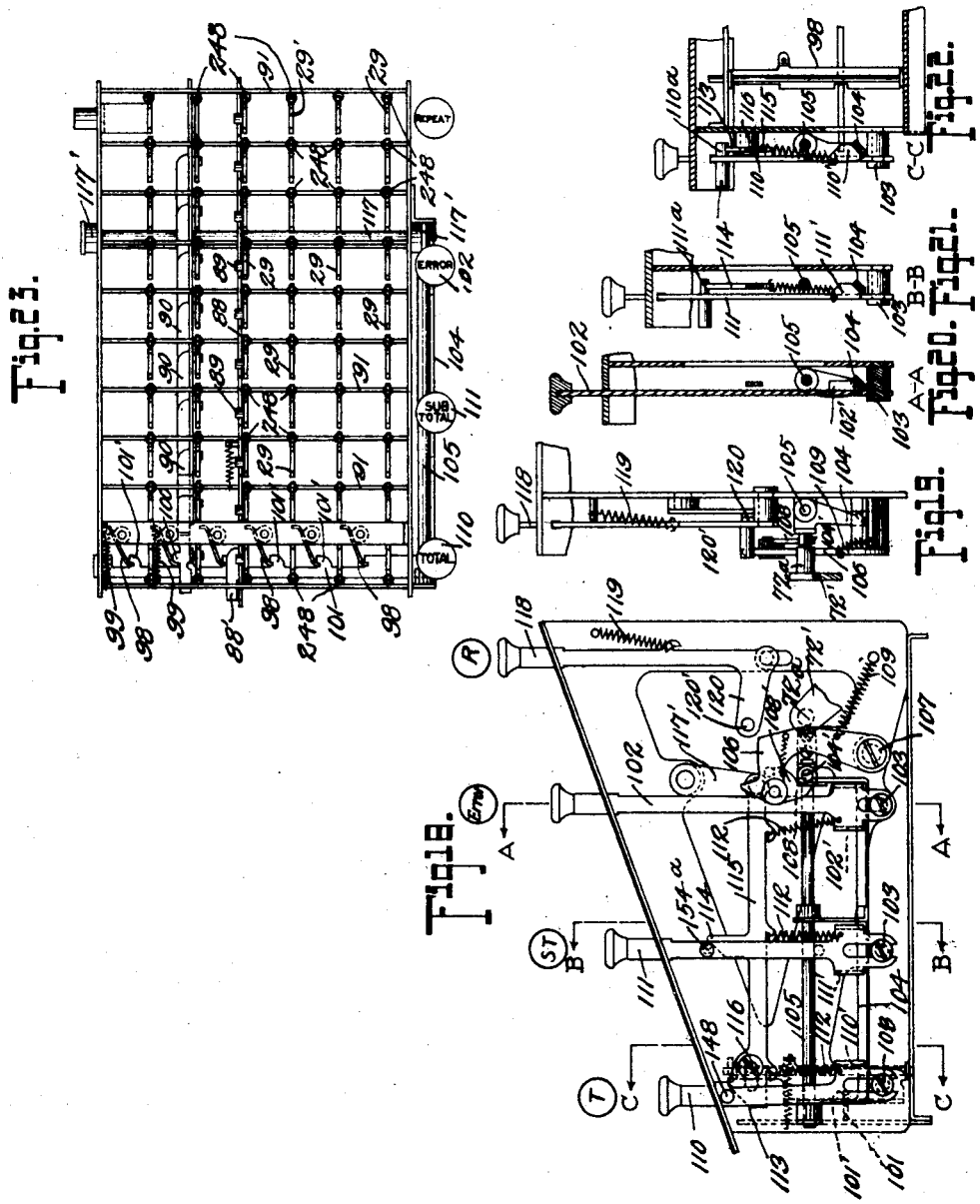

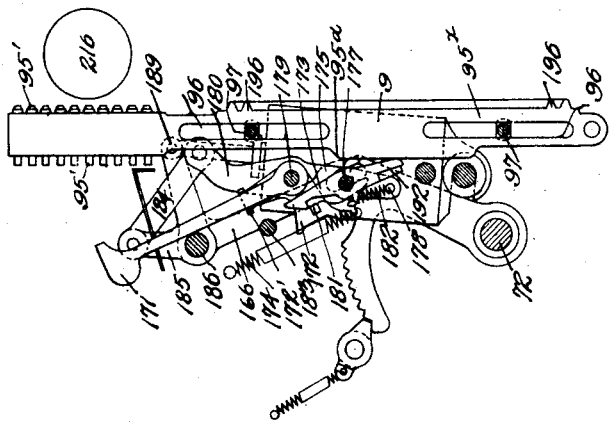
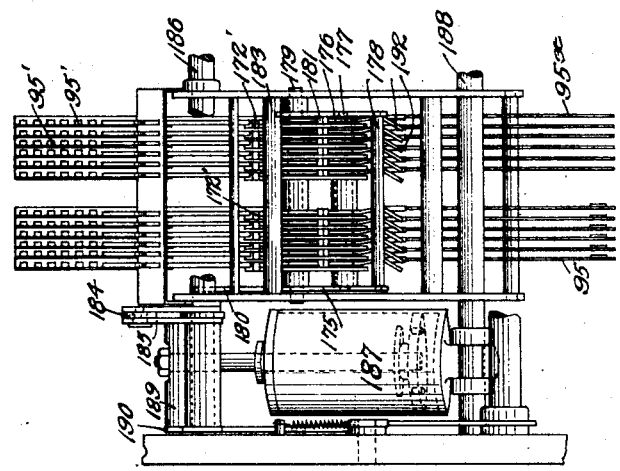

Aug. 6, 1929.  N. WHITE ET AL  1,723,263
MECHANICAL CASHIER, ADDING, AND LISTING MACHINE
Filed June 7, 1912  17 Sheets-Sheet 14
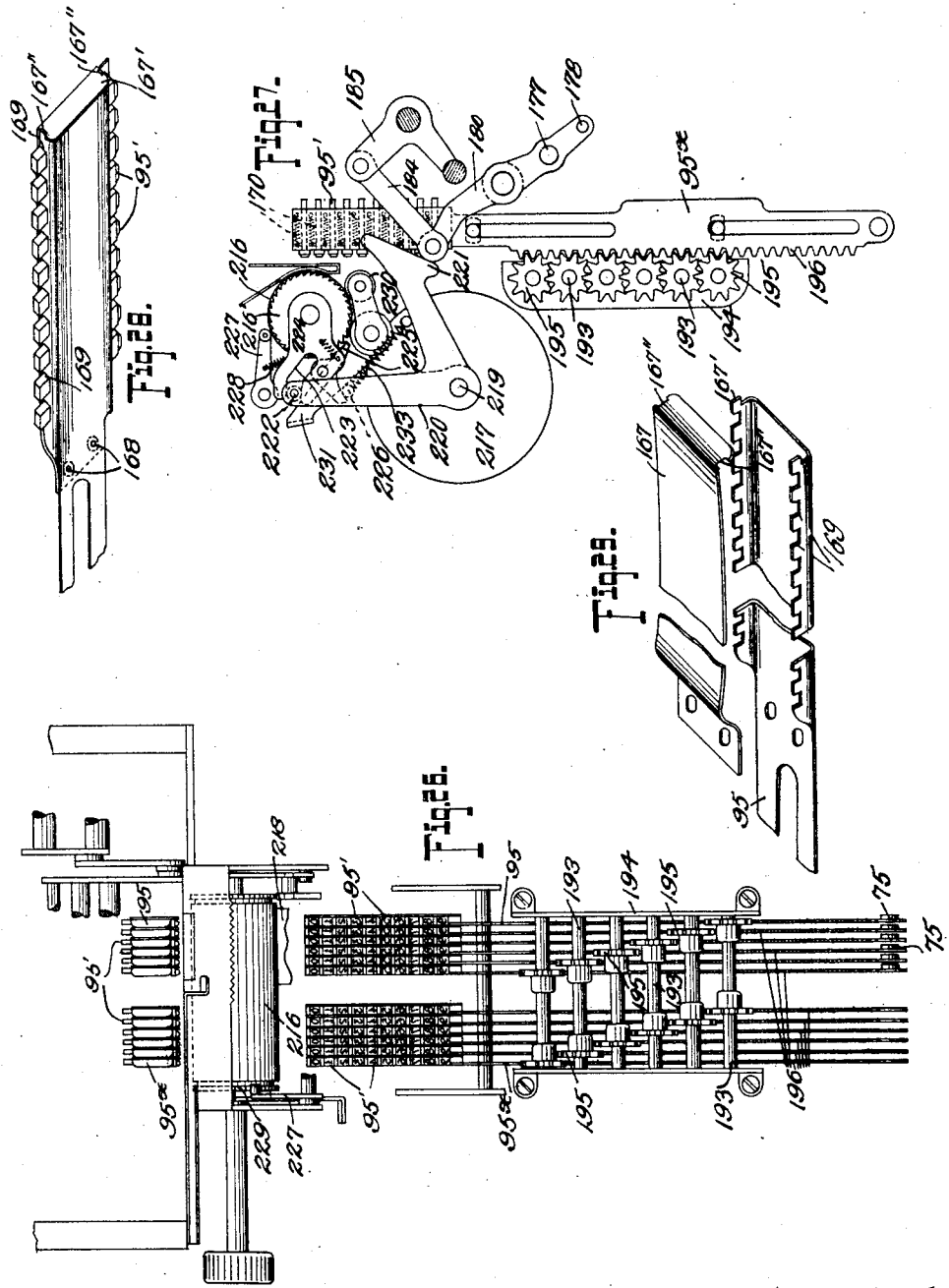

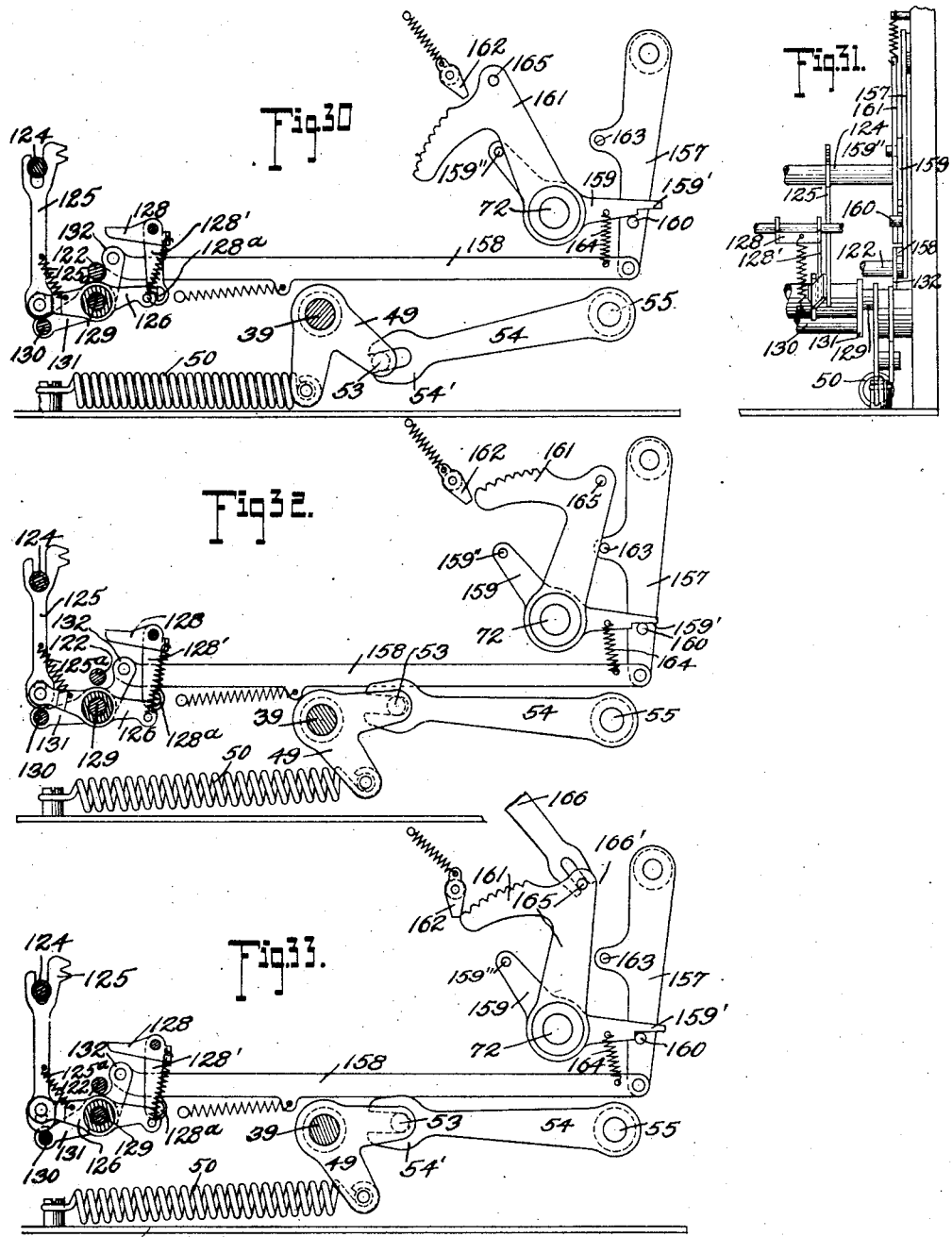

Aug. 6, 1929.  N. WHITE ET AL  1,723,263
MECHANICAL CASHIER, ADDING, AND LISTING MACHINE
Filed June 7, 1912   17 Sheets-Sheet 16
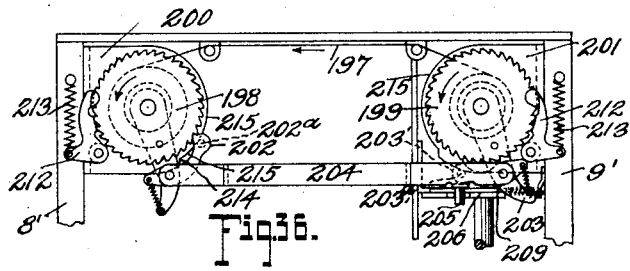
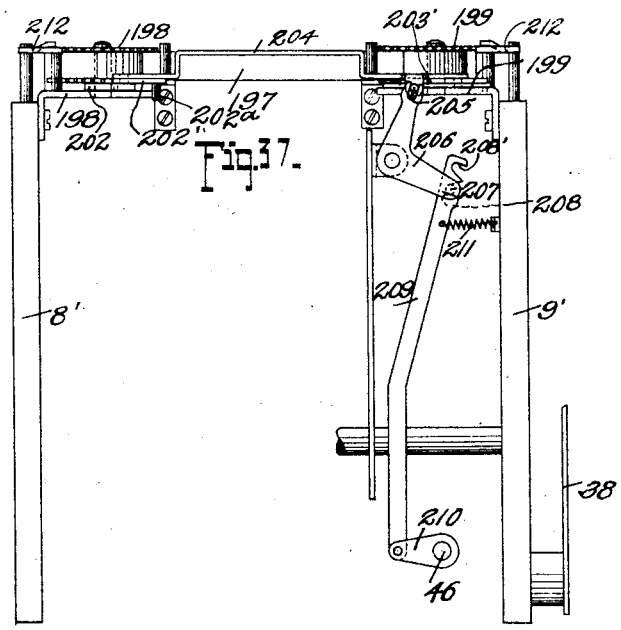

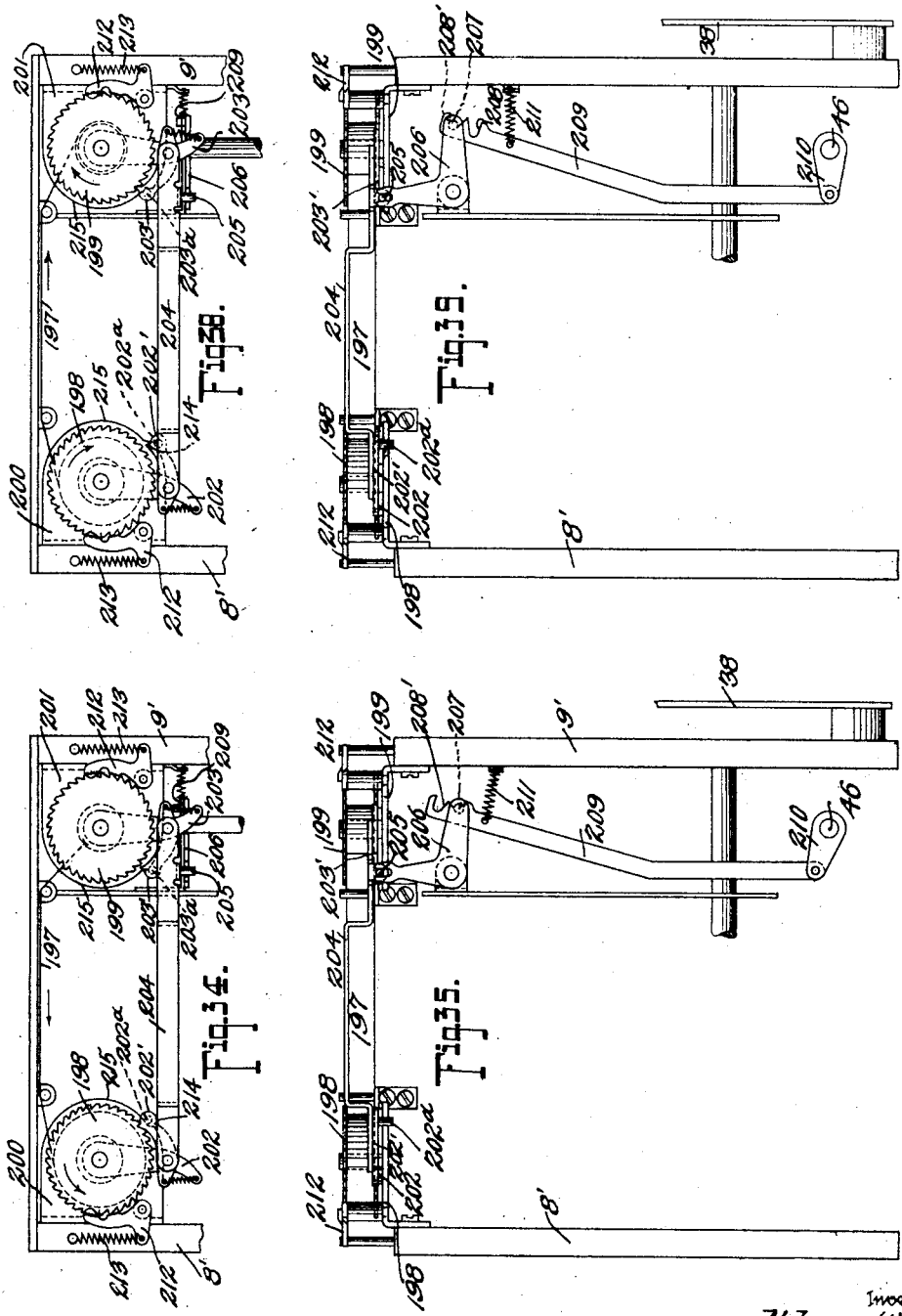

Patented Aug. 6, 1929.

1,723,263

UNITED STATES PATENT OFFICE.

NELSON WHITE, WILLIAM S. OVERLIN, AND FRANK A. BULLINGTON, OF PORTLAND, OREGON, ASSIGNORS, BY MESNE ASSIGNMENTS, TO REMINGTON ARMS COMPANY, INC., OF NEW YORK, N. Y., A CORPORATION OF DELAWARE.

MECHANICAL CASHIER, ADDING, AND LISTING MACHINE.

Application filed June 7, 1912. Serial No. 702,164.

Mechanical cashiers comprising means for delivering money in predetermined denominations and amounts have been proposed. Those which are controlled by suitable manipulative devices operable according to an amount of purchase and an amount received constitute what are known as money changers in the sense that they really compute or select mechanically an amount representing the difference between the amounts mentioned. The employment in these machines of mechanism for registering or adding amounts of the various transactions of the machine and even for printing or listing these transactions is more or less common.

Machines of the above type, especially those for money delivering purposes, are particularly useful in banks, factories for making up pay rolls, and in similar places of business, while the machines of the change making class which mechanically determine and discharge change are primarily adapted for use by department and other stores and in business establishments where money is paid in for purchases, or the like, and change must be made and returned.

In so far as we are advised, the paying or money handling and the listing or registering mechanisms, of those mechanical cashiers devised up to this time have been wholly unitary. That is to say, they are inseparable and operated for any and all transactions of the machine. Thus, if the machine is to pay, the registering or adding, or the listing means, are necessarily actuated, and it is impracticable to operate the latter mechanisms independently of the money paying section.

In most business establishments and institutions, there is a positive need for an adding and listing machine for its general uses; in many such places, a money paying machine would be especially useful for its particular purposes whether it be a deliverer simply, or a change maker. With the foregoing in view, the essential and important object of our invention has been the production of a combined money handling or paying mechanism and adding and listing mechanisms, so co-related that under certain conditions, they may be used practically as a single machine to perform their respective functions as such, whereas, under other conditions, the adding and listing mechanisms may be utilized as a separate machine for operation absolutely independent of the paying mechanism.

Our invention comprehends broadly the idea or principle of construction for obtaining the advantageous results described, irrespective of the specific instrumentalities set forth hereinafter, and by this invention, a single machine is adapted to perform those operations that have heretofore required two separate complete machines.

The invention contemplates additionally, that the machine embodying the same shall be so constructed that the adding and listing means are capable of actual detachment from the paying or money section proper to constitute a complete separate machine, if desired, and yet always susceptible of ready connection with the paying section in such co-operation as to produce a different machine having the combinative functions or wider field of use hereinbefore described. Considered in its broader phase, the invention involves a machine comprising a money paying or changing mechanism as operative by a register or adder, or operable in connection with a listing or printing mechanism, whether the two latter mechanisms are combined in one machine or not, as was contemplated in the preliminary portion of this statement.

The foregoing adaptation assumes, of course, that the adder, and the printing mechanism, in themselves, may each be a complete machine capable of use independently of any money paying mechanism.

With the purview of the invention in mind, therefore, we do not wish to be limited to any special form of paying mechanism, or to those particular adding or printing instrumentalities which are all hereinafter set forth in detail, because any equivalent means thereto may be employed in the peculiar association described.

Under actual conditions of service of cashier machines another desideratum of importance has arisen. There are times in the use of our combined money paying, adding and listing machine, when the operator will be called upon to make change by way of a mere exchange of money as, for instance, the supplying of cash in small denominations equivalent in value to money received of a higher denomination, and which latter would be deposited in the machine, or credited as a received amount in some way or other. Obviously, the exchange aforesaid could be made by operating the regular manipulative devices, or amount keys, of the main controlling keyboard. However, these keys are designed to be employed ordinarily only to pay out, add and list transactions representing money actually taken from the machine. To prevent confusion that would arise were the delivery, or real change items of the machine, listed with what may be termed the exchange transactions just referred to, suitable provision is made. For this purpose there are utilized special exchange manipulative devices in the form of keys that are adapted to control the money delivery action of the paying section through the ejector selecting mechanism and main actuator of the machine, but without causing actuation of the adding and listing means.

Ancillary to the feature just previously described it may be noted that still another demand upon the machine in reference to its adaptability to meet the requirements of working conditions, is provided for in evolving this invention. Often, in money handling, a coin or bill is proffered for exchange for a number of pieces of money of less value but of like denomination. Since, in the ordinary operation of this machine, the main keyboard, and even the exchange keys above referred to, co-operate with a selecting mechanism to discharge coin by the quickest method namely, the selection of several pieces of money of different denominations equivalent to the amount represented by the operated keys, some separate means must be provided to deliver a number of coins of a single denomination. These means comprise what may be termed denominational keys, and the latter are advantageously combined with the ejector mechanism so that when the machine is at rest, the operator is at liberty to actuate a denominational key one or more times to discharge money pieces of the same denominational value each time the key is moved, and without any operation whatever of the listing or adding means.

The denominational keys are carried by the paying or money section of the machine and the exchange and amount keys by the adding and listing section. The arrangement of the various sets of manipulative devices aforesaid is peculiarly advantageous because when the paying section is disabled, or is rendered inoperative in respect to the adding and listing section, whether or not the latter be detached or used as a separate machine, the paying section also remains a complete machine since the denominational keys are not disturbed and may be available of for transactions of the character for which they are designed. The sphere of usefulness of the paying section under the last mentioned conditions is somewhat limited, it is true, but this feature of the invention is thought to be broadly new since we are not aware that a money paying, adding and listing machine has yet been produced wherein the money paying mechanism is a complete machine and the adding and listing means likewise complete, and both capable of operation as separate machines and to be assembled in one to then operate as a combined construction.

Included in this invention also is an advantageous general arrangement of the various mechanisms of the machine, the adding means being at the front, the listing or printing means at the rear, the paying section at the left, and the manipulative amount keys and controlling parts directly coacting therewith being arranged intermediate the adding and printing means convenient for co-operative action in governing the operation of the selector mechanism that forms a part of the money paying section. A general economy of space and compactness of parts is subserved by the above arrangement.

Among other novel features of the invention are the provision of an alarm or signal device for the money paying section of the machine, and which is automatically actuated at a predetermined time to notify the operator that replenishment of one or more of the money receptacles is required; and also a peculiar ejector action for the money receptacles including novel means controlling the movement of each ejector to relieve the friction between the same and superposed coins in the receptacle on the normalizing movement of said ejector.

In the drawings, Figure 1 is a front view of a money paying, adding, and listing machine embodying the invention.

Figure 8 is a fragmentary view in elevation bringing out more clearly the control mechanism and main actuator.

Figure 9 is a fragmentary view showing primarily the parts illustrated in Figure 8.

Figure 10 is a partial top plan and sectional view taken horizontally through the adding section of the machine to bring out the lever connections between the adding racks and the type carriers.

Figure 11 is a transverse section illustrating the "Non-Pay" key and its co-operation with the disabling means for the paying section; also the arrangement of the selector bars.

Figure 12 is a fragmentary top plan and partly sectional view of the parts illustrated in Figure 11.

Figure 13 is a view of the adding section with the front casing plate removed, showing the adding mechanism and parts of the indexing devices.

Figure 14 is a plan view of parts of the frame adjacent to the adding devices, and illustrating more particularly the co-operation of the carry-over and totaling pawls with the latches controlling the operation of the carry-over racks.

Figure 15 is a sectional diagrammatic view of the transfer or carry-over mechanism in the act of tripping the adding wheels when in mesh with the adding racks, the transfer being delayed.

Figure 16 is a view similar to Figure 15, showing the completion of the transfer or carry-over.

Figure 17 illustrates the parts of the accumulating mechanism in their normal position, the view being a section approximately on the line A—A of Figure 13.

Figure 18 is a view showing in elevation the special keys and associated operating mechanism, as well as certain key release devices.

Figure 19 is a view looking forwardly toward the "Repeat" key and illustrating certain parts shown in Figure 18.

Figure 20 is a sectional view taken approximately on the line A—A of Figure 18.

Figure 21 is a sectional view taken approximately on the line B—B of Figure 18.

Figure 22 is a sectional view taken approximately on the line C—C of Figure 18.

Figure 23 is a plan view of certain parts of the indexing mechanism, and showing the key release means and general arrangement of the special keys.

Figure 24 is a side elevation of the listing or printing mechanism.

Figure 25 is a front view of the parts shown in Figure 24, the frame of the machine being broken away, and certain parts such as springs omitted.

Figure 26 is a rear view of the parts shown in Figures 24 and 25.

Figure 27 is a view of the printing mechanism looking toward the left hand side of the machine and bringing out clearly the means for feeding the platen forward.

Figures 28 and 29 are detail perspective views of one of the type carriers showing the manner of joining the composite parts thereof.

Figure 30 is a partial section and side elevation of the carry-over control mechanism.

Figure 31 is a rear view of the parts shown in Figure 30.

Figures 32 and 33 are views similar to Figure 30 but showing the parts arranged at different stages in their operation.

Figure 34 is a top plan view of the ribbon feeding and reversing mechanism.

Figure 35 is a front elevation of the same.

Figures 36 and 37 show the ribbon mechanism about to reverse.

Figures 38 and 39 are views showing the ribbon feeding mechanism after being reversed and with the ribbon feeding in an opposite direction to that shown in Figures 34 to 36, inclusive.

Figure 1:
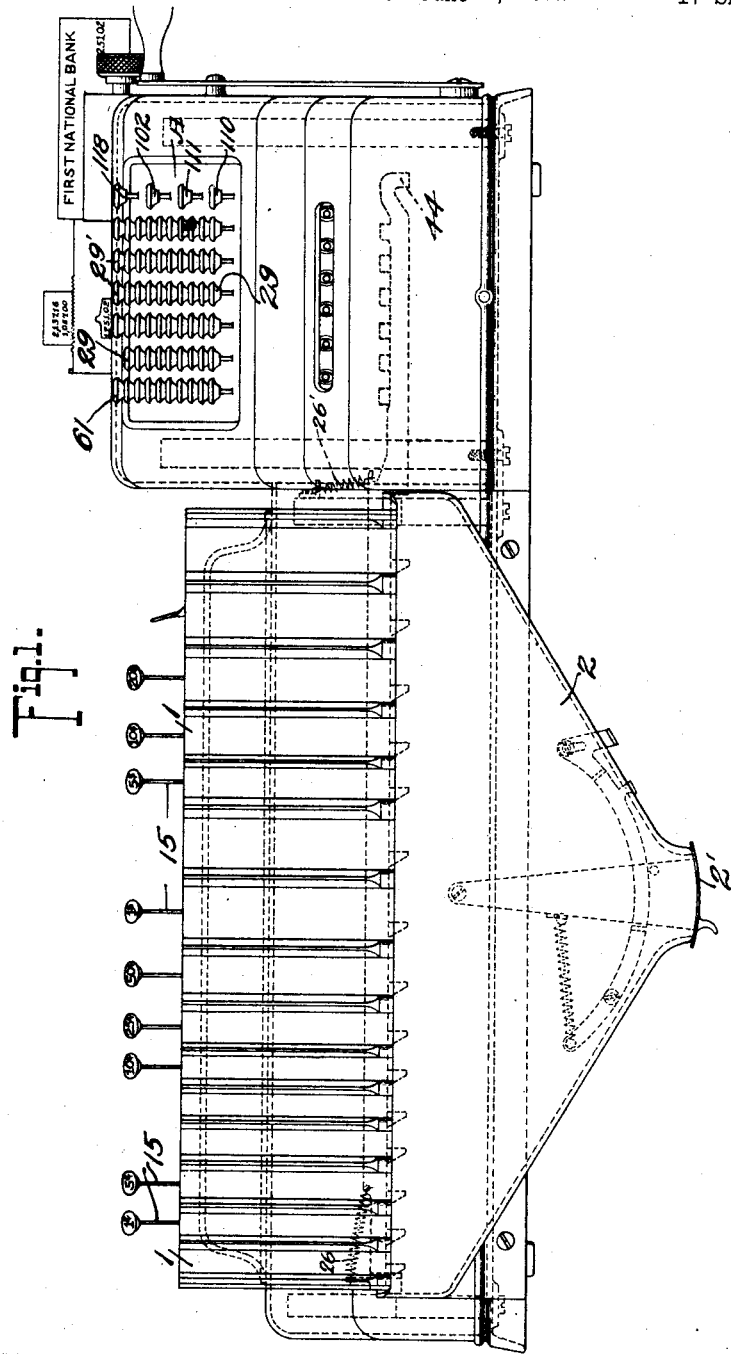

Before passing to a detailed description of the invention, it should be noted that, as a general thing, the most complicated part of a cashier machine, or an adding machine, is the keyboard controlling mechanism, involving as it often does, several hundred different parts. The money ejecting means of a mechanical cashier is usually comparatively simple. In the combined machine of this invention, therefore, a single keboard only is necessary, the same being utilized as the controlling manipulative means for the combined machine and for the adding and listing means when the latter is employed independently, and a great saving in manufacturing cost is thus effected. In carrying out the invention, another special object has been to provide as simple means as practicable for rendering the paying section of the combined machine inoperative at will, to produce the independent adding and listing machine, this object being realized to the extent that the depression of a single disabling key, or like simple manipulative device is all that is necessary to discontinue the co-operation of the paying mechanism with respect to the adding and listing means, and the latter means as well as the former may from then on be used as separate machines.

It is to be understood also that the various mechanisms of our machines are novel in their general co-operation and certain of them, such as the amount key controlling devices, the printing means, adding devices, selector mechanism, and other associated parts, are each possessed of novelty as a complete means for its particular purpose, so that it might be adapted to a different construction of machine from that hereinafter presented.

To facilitate a complete understanding of the present machine, the different general mechanisms will be separately described in detail and in regular order, after which the combinative functions and operation of the same as a complete single machine will be set forth.

Reference is made at this time to the patent to Thomas Bilyeu and William S. Overlin, No. 985,136, issued February 28, 1911, and describing certain key controlled selecting means for the ejector mechanism of a coin delivery machine, and which means in principle is quite the same as equivalent devices hereinafter generally described, but which are modified and improved upon to adapt them to the machine of the present invention.

*The cashier or money paying mechanism.*— The term "cashier or money paying mechanism", as used hereinafter contemplates money handling means broadly and, except as otherwise claimed, irrespective of whether the cashier mechanism is designed to pay or deliver money primarily, or selectively receive money in the form of coinage or bills, as for some purposes, means of the last mentioned class might be useful and has, in fact, been proposed in the art to which the present invention relates. The cashier or money paying mechanism comprises ejector means in the left hand section of the machine as illustrated in the drawings, the right hand section embodying the manipulative keys or controlling devices for certain parts of the paying mechanism, together with the printing or listing means and detail parts to be hereinafter specifically described. At the front of the money paying section are arranged money holders or receptacles 1, certain of said receptacles being of the same size to receive coins of like denomination, and other varying sizes of receptacles being provided for coins of different denominations. As much as possible, the receptacles of the same size (Figs. 4, 6 and 11) are grouped or arranged next to one another.

Leading downwardly from the base of the receptacles 1 is a delivery chute 2 common to all of the receptacles, as in the patent previously referred to. Ejectors 3 are provided for the receptacles and are operable by means quite similar to the means of the aforesaid patent. Each ejector 3 inclines upwardly toward its front end and is adapted for a movement intersecting the lower end of its co-operating coin receptacle, the rear wall of the receptacle having an opening 4 (see Fig. 6) through which the ejector 3 operates to engage the lowermost coin or coins in the receptacle and discharge the same into the chute 2. At its front end, the ejector 3 is guided in its movement by an upper plunger 5 and a lower plunger 6 in direct engagement with the upper and lower sides of the ejector, respectively, and the purpose of which will be pointed out more fully hereinafter. At its rear end, the ejector is supported by a plate 7 which extends the entire length of the cashier section of the machine, being secured at its opposite ends to the end frames or walls 8 and 9 of said section, the arm 7′ intermediate the ends of the cashier section also supporting said plate 7. At their rear extremities the ejectors are provided with upturned lugs 10. The lugs 10 of certain ejectors, namely, one ejector for each denomination of coin in the receptacles 1, are normally engaged in notches in the lower ends of ejecting levers 11 which are loosely mounted between their ends upon a rock shaft 12, which also extends the entire length of the cashier section of the machine. The shaft forms a pivotal support between the ends of the levers 11 and the upper end of each of said levers is connected by a link 13 with the vertical arm of a bell crank 14, the other arm of said bell crank being pivotally connected with the stem of a denominational key 15. The several denominational keys 15 have suitable finger pieces at their upper ends and are located in rear of the receptacles from which they are adapted to eject money. The springs 16 are connected with the casing of the machine at one end and with the links 13 at the other end, and normally tend to hold the keys 15 in their uppermost positions, and the ejectors 3 retracted in an inactive position. The axis of the bell cranks 14 is designated 14′.

The rock shaft 12 above mentioned is the ejector actuator of the machine and projecting downwardly from said shaft are arms 17, to the lower extremities of which is attached an ejector bar 18 formed with rearwardly and downwardly projecting notched ears 19 which are normally laterally spaced from the lugs 10 of the ejectors 3, some of which ejectors, it will be remembered, are normally engaged with the levers 11, while other of said ejectors are free at their rear ends, merely resting at this point upon the plate 7. The notches of the ears 19 are in alignment with the lugs 10 of the ejectors so that by the operation of suitable means, including selector bars, the rear ends of any one or more of the ejectors 3 may be moved laterally to engage their lugs 10 with the adjacent notched ears 19, one of which is provided for each ejector.

Figure 5:
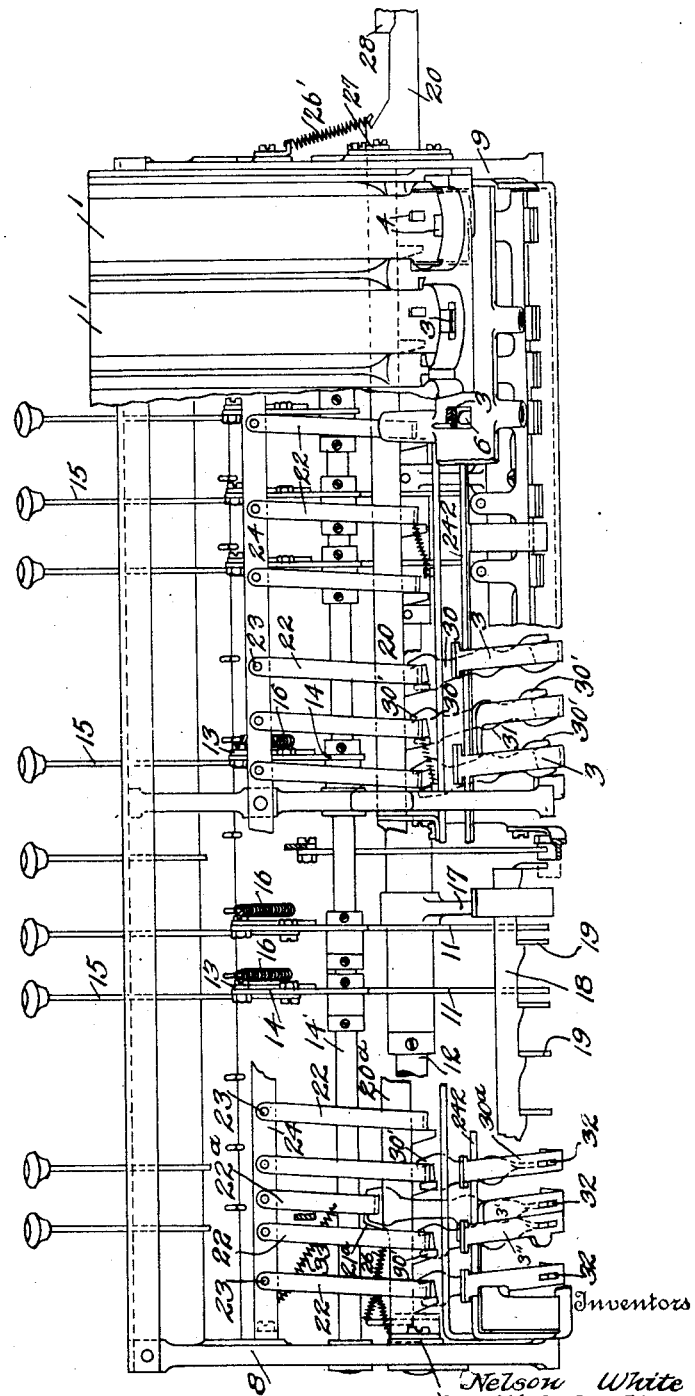
Figure 5 is a front view of the cashier section of the machine with parts broken away to clearly show the various features illustrated in Figure 4.

The selector mechanism above referred to includes a plurality of series of selector bars 20, each bar having projecting from its lower edge one or more selecting lugs 21 adapted to engage corresponding pendent yoke or bail members 22. The members 22 are pivotally hung at 23 from supporting bars 24, suitably mounted upon the end frames of the cashier section. The selector bars are adapted for both longitudinal and downward movement, their left hand ends being seated upon a cross piece 25 on the end frame 8, springs 26 being secured at one end to the part 25 and at the other end to the selector bars 20, and normally exerting a tension to pull the bars longitudinally and leftwards, according to the views in the drawings. Other springs 26' are connected at their upper ends with the end frame 9 and thus at the lower end with the intermediate portions of the bars 20 and normally hold said bars at the upper limit of their movements against a universal transverse stop plate 27 (see Figs. 3 and 5). The selector bars extend the entire length of the cashier section and also entirely across the key section as shown in Fig. 2 of the machine, each selector bar being formed with a vertical projection 28 located within the key section and adapted to co-operate with an adjacent one of the keys 29 of said section (see Fig. 3).

Co-operating with each bail member 22 is an ejector actuating lever 30, said lever being bifurcated at its upper and lower ends, as shown at 30' (see Fig. 5) and pivoted between its ends at 31. The bifurcated upper ends of the ejector levers 30 engage the transverse portions of adjacent bail members 22 and the similarly formed lower ends of said levers straddle adjacent ejectors 3 and form guides for said ejectors in their longitudinal ejecting movement. Several of the ejector actuating levers, designated 30ª, instead of being bifurcated at their lower ends, have said ends interlocked with coacting ejectors by passing through slots 32 in the latter, the said slots being elongated to permit of the ejecting movement of the last named ejectors. Also, there is provided a special selector bar 20ª having an upwardly projecting lug 21ª, equivalent in function to the lugs 21 of other bars, the said lug 21ª engaging a special bail member 22ª, held in a predetermined position by a spring 33 (see Figs. 4 and 6). The several ejector actuating levers 30 and 30ª are pivotally supported on a bar 34, suitably mounted in the casing of the cashier section. Those of the ejectors 3 not normally having their lugs 10 engaged by the levers 11, are engaged normally by notched plates 35, which lock the said ejectors from longitudinal movement until their lugs 10 are thrown into alignment with one of the notched ears 19 of the ejector bar 18. With the foregoing construction in view, it will be apparent that if any one of the denominational keys 15 is depressed one or more times, it being normally in operative connection with its associated ejector 3, the lever 11 will be operated on each depression to impart longitudinal movement to its ejector 3 to discharge a coin.

If one of the keys 29 of the main key board is depressed, it will correspondingly lower its selector bar 20 by engagement with the projection 28 of the latter. If, after said selector bar is lowered, a longitudinal movement is imparted to said bar to move it to the right, as shown in the drawings, it is obvious that the lugs 21 of the bar will tilt the bail members 22 engaged thereby and correspondingly impart tilting movement to the actuating levers 30. The tilting movement of the predetermined actuating levers 30 will move the ejectors 3 engaged by said levers from their normal position to one in which the lugs 10 of the ejectors are interlocked with notched plates 19 of the ejector bar 18. Then, on rocking movement of the ejector bar caused by general operating mechanism to be set forth hereinafter, those of the ejectors 3 which have been rendered interlocked with the parts 19 of the ejector bar, will be moved longitudinally to traverse the base of the associated coin receptacles and discharge proper coins therefrom. The said operating means for the ejector shaft 12 initially operates to pull any lowered ejector bar 20 longitudinally (see Fig. 5) to the right, thus selecting the proper ejectors, and subsequently operates to rock the shaft 12 to cause ejecting movement of the selected ejectors. As will be noted by reference to Figure 4, two ejectors designated 3' and 3" may govern the discharge of coins from a single receptacle, and the ejector 3' has a lug 36 to normally engage in a notch 37 on the ejector 3". The ejector 3' is operable by its bail member 22ª to be moved laterally with the ejector 3" until the latter engages a notched plate 19, whereupon, when the bar 18 is rocked by the shaft 12, both ejectors will operate to discharge two coins from the co-operating receptacle 1. However, the ejector 3" is operable by its bail member 22 to be moved laterally independently of the ejector 3', the parts 36 and 37 thus disengaging, under which conditions, the member 3" will eject only one coin in its discharging movement.

Figure 2:
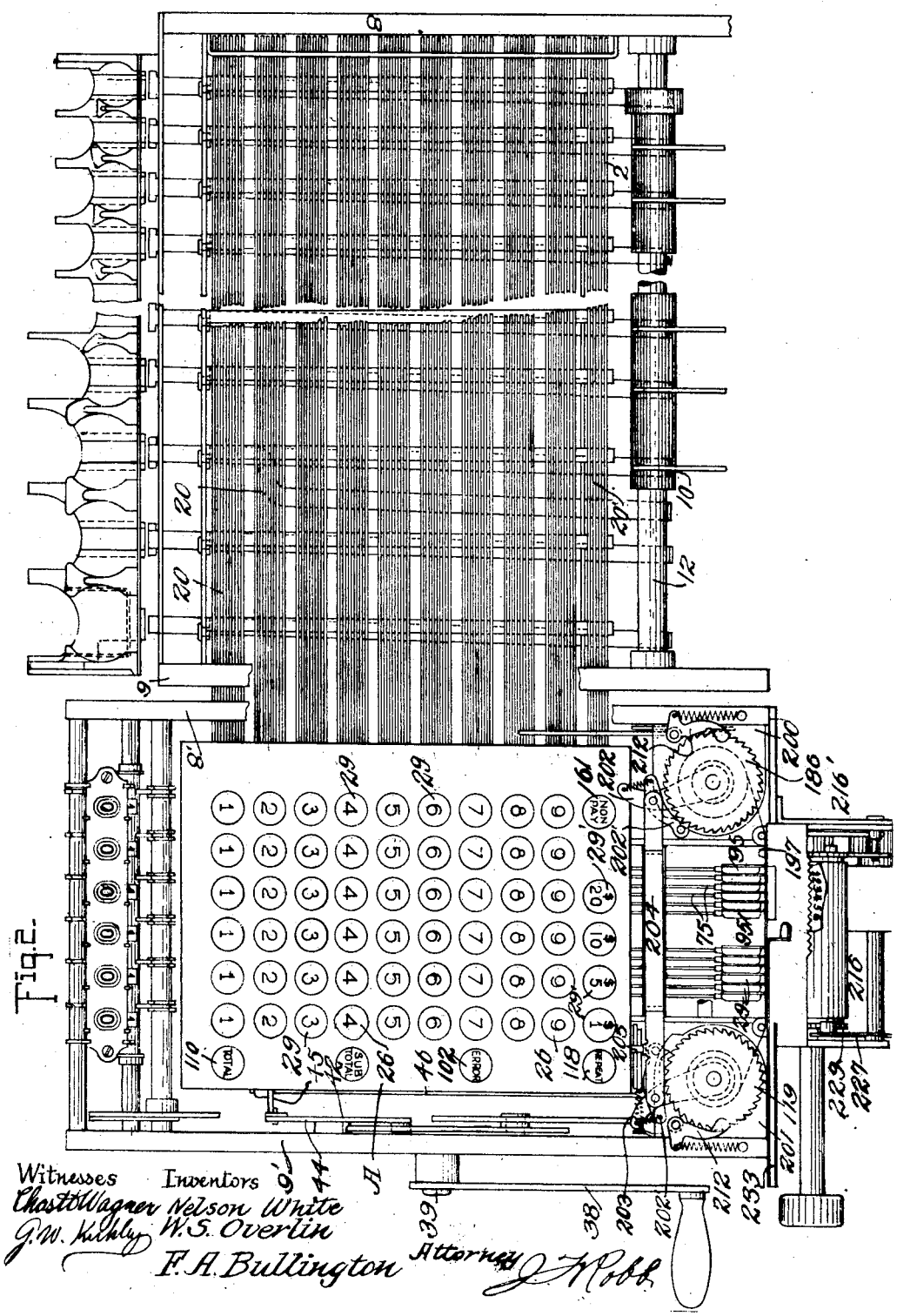
Figure 2 is a plan view of said machine showing the top plate of the cashier section removed and the denominational key mechanism omitted to bring out more clearly the arrangement of the selector bars.
Figure 3:
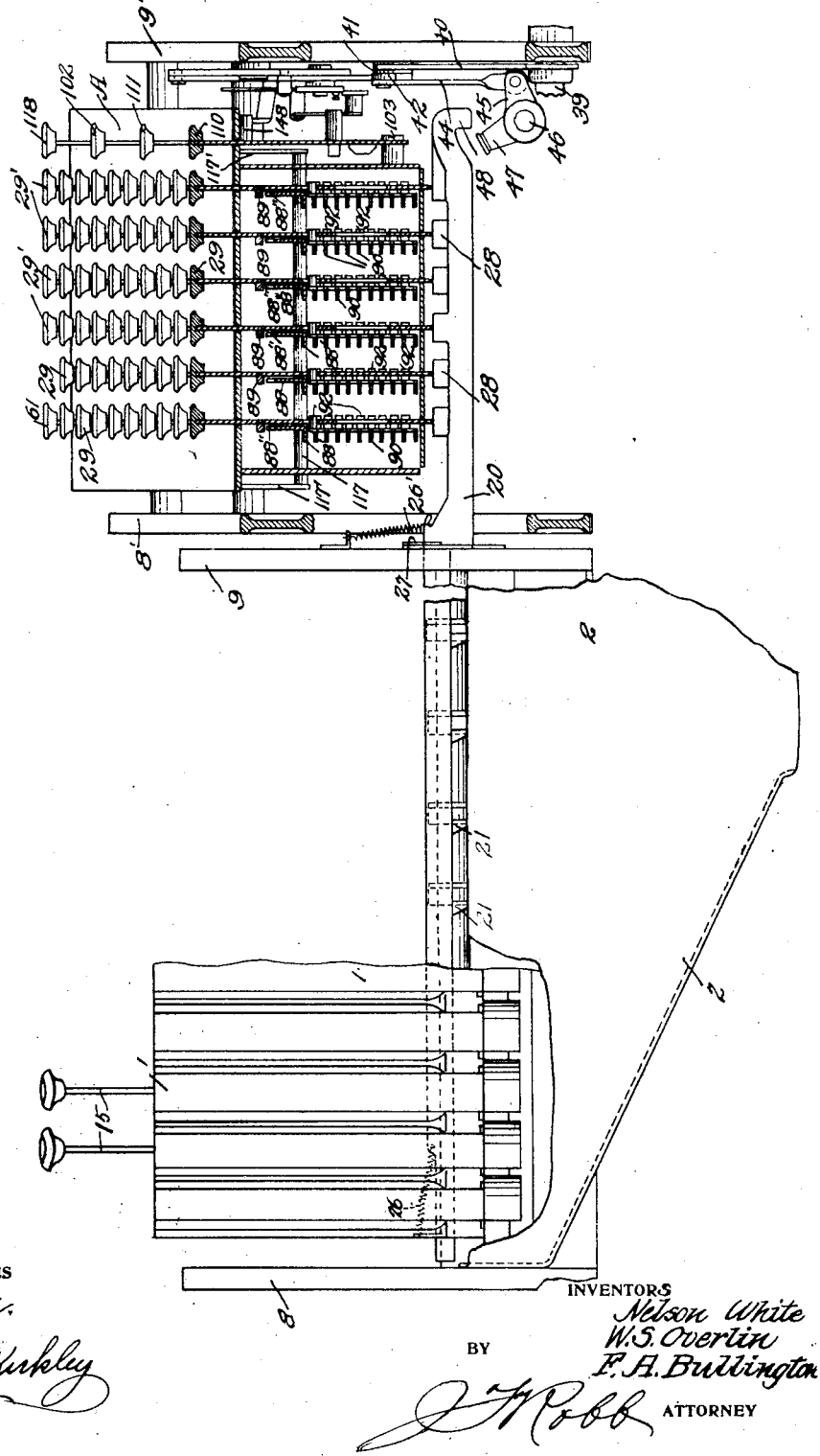
Figure 3 is a front view showing a portion of the coin receptacles broken away as well as the coin chute in order to bring out more clearly the arrangement of the selector bars in relation to the operating means therefor, the front transverse row of amount keys being shown in section.
Figure 7:
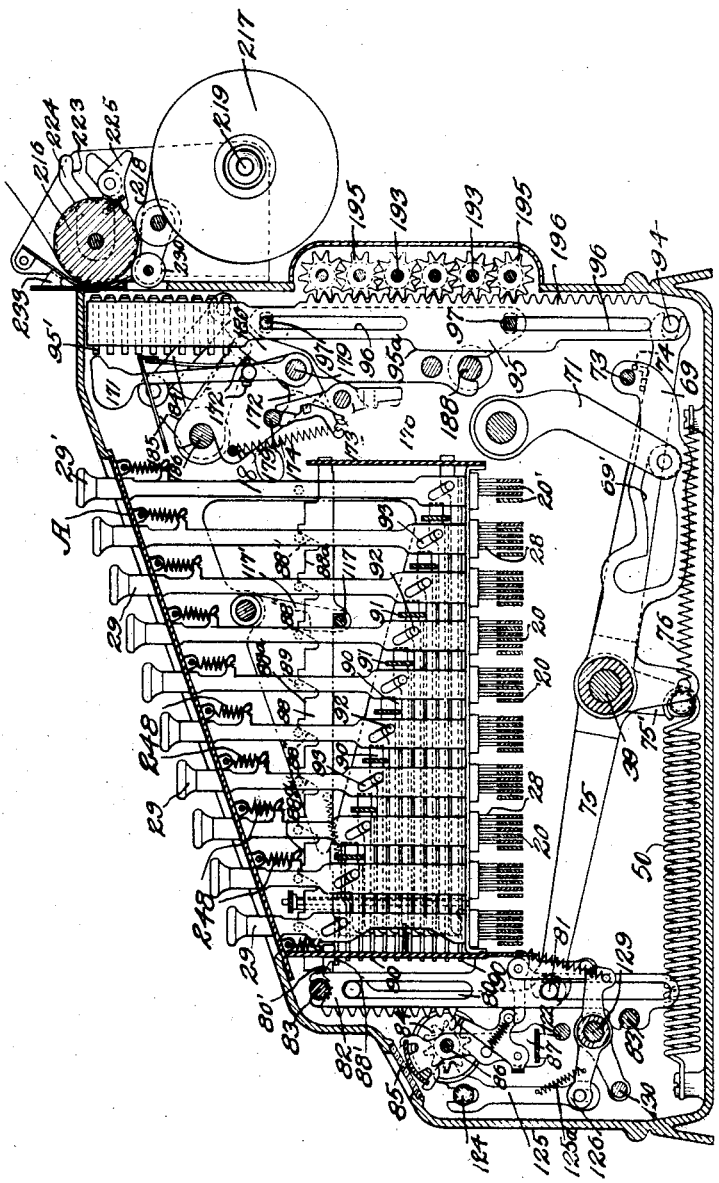
Figure 7 is a transverse sectional view through the adding and listing section of the machine and disclosing clearly the indexing mechanism.

*Keyboard.*—As shown most clearly in Figures 2, 3 and 7, the main keyboard A is located in what may be called the keyboard, adding or listing section of the machine. This keyboard consists of a bank of keys comprising a number of rows. The keys of each row, referred to hereinbefore as 29, are numbered from 1 to 9 on the finger pieces thereof, the arrangement of said keys being substantially in accordance with the decimal system of coinage, the first row at the right being units keys controlling the delivery from the machine of any amount up to 10¢; the keys of the second row are tens keys; those of the third row are hundreds keys, and so on, there being any desired number of rows, according to the desired capacity of the machine. The machine, as illustrated, is capable of delivering any amount from 1¢ up to $9,999.99, and to add and list amounts within the above maximum. The foregoing, of course, refers to the capacity of the machine exclusive of any operations which may be performed by the denominational keys 15, not in the main keyboard and by their keys 29' referred to hereinafter as change keys, and which are associated with the main keyboard, along with certain special keys designated "Repeat", "Error", "Sub-Total", and "Total", the latter operating only as a part of the adding and listing mechanism.

The selector bars 20 are arranged in groups, slightly spaced from one another from the front to the rear of the machine. The bars 20 of the first group at the front of the machine extend beneath the first keys of the various rows of the keyboard; the second group of bars 20 extend beneath the second keys of the rows of the keyboard, and so on. As before mentioned, each key 29 is arranged to engage at its lower end with the vertical projection 28 on its co-operating selector bar 20 to depress said selector bar. All of the various keys 29 are adapted to co-operate with the adding and listing mechanisms to control the action of the latter, said keys 29', however, being designed as change keys only and are not adapted to control in any way the operation of the adding and listing means. The rows of keys 29 may be of any desired number.

*Main actuator.*—In Figures 3, 8, 9, 11 and 12, it will be seen that a main actuator in the form of a handle 38 is provided, the same being mounted upon a main operating shaft 39 mounted in bearings in the end frames 8' and 9' of the keyboard section of the machine. On the shaft 39 is rigidly mounted a cam 40 of segment form, the cam surface 40' of said cam 40 being adapted to engage a roller 41 of a lever 42 pivoted between its ends to the frame part 9'. The roller 41 is carried by one end of the lever 42, the other end of the lever being normally held up by a spring 43, and being connected by a link 44 to an arm 45 on a selector shaft 46. Rigidly mounted on the selector shaft 46 is a selector actuating bail 47 extending nearly the entire depth of the section of the machine from the front to the rear and just below the right hand ends of the selector bars 20. Said ends of the selector bars 20 are provided with hooks 48 capable of being engaged with the bail 47 when the selector bars are depressed by the action of the keys 29 and 29'. Assuming now that one or more of the keys 29 or 29' have been depressed, their co-operating selector bars will be depressed sufficiently to engage the hooks 48 thereof with the bail 47; then on pulling the handle 38 forwardly, the cam 40 will be actuated to tilt the lever 42 and impart rocking movement of the bail 47 toward the frame member 9'. Those of the selector bars 20 engaged with the bail 47 will be moved longitudinally to the right against the tension of the springs 26, thereby setting certain operated ejectors 3 in a position to be actuated by the hereinbefore described ejector bar 18 by means now to be described.

*Cashier section disabling means.*— As shown clearly in Figures 11 and 12, a bell crank lever 49 is mounted to turn with the shaft 39, which is normally held in a predetermined position by the springs 50 and 52 (Fig. 10), the spring 50 being connected with the lower arm of the lever 49 and the spring 52 being connected with an arm 51 projecting downwardly from the cam 40. The rearwardly extending arm of the bell crank lever 49 has a stud 53 projecting therefrom into engagement with the forked end 54' of an approximately horizontal arm 54 carried by a stub shaft 55 journaled in the frame member 8'. The stub shaft 55 passes through the frame member 8' and carries on its outer end a vertical arm 56 arranged at about a right angle to the arm 54 which latter is carried by the inner end of the shaft 55 and located really within the key section of the machine. On the upper part of the frame member 8' there is arranged another stub shaft 57 passing through the frame 8' and carrying on one end a release arm 58 arranged between the parts 8' and 9, the other or inner end of the shaft 57 carrying a depressible arm 59 located in the path of movement of a lateral stud 60 projecting from the lower extremity of a "Non-Pay" key 61 mounted for vertical movement in the upper left hand corner of the keyboard A. A spring 62 normally tends to hold the "Non-Pay" or disabling key 61 elevated.

The ejector shaft 12 before referred to extends through the end frame or member 9 of the cashier section and terminates between said member 9 and the similar member 8' of the keyboard section, as shown in Figure 12. This terminal of the shaft 12 carries an approximately vertical rocker arm 63, rigid therewith, and to the upper terminal of the arm 63 is pivoted a disabling catch or hook 64 normally held at the limit of its upward movement by a spring 65. The disabling hook 64 engages a stud 66 on the upper end of the arm 56 aforesaid. The parts 63, 64, 66 and 56 are, of course, located in the space between the frame members 9 and 8', as well as the arm 58, and it may be noted that said arm 58 is adapted to engage the uppermost portion of the hook 64. The selector actuating bail 47 reciprocates on every operation of the machine along with the shaft 39 and therefore each movement of the shaft 39 is transmitted to the arm 56 through the parts 49 and 54. As the hook 64 is normally engaged with the stud 66 on every operation of the shaft 39 by the handle 38, when the parts are arranged, as shown in Figure 11, the ejector shaft 12 will be rocked to move all of such ejectors as have been properly selected by the keys 29′. The arrangement of the selector bar hooks 48 and the actuating bail 47 is such that on pulling the handle 38 forwardly, the selector bars 20 are immediately actuated to set the proper ejectors 3 in an operative position in relation to the ejector bar 18. There is sufficient loose play between the stud 66 and the disabling hook 64 to permit this selecting movement to be performed before the disabling hook is actuated by the stud 66 to impart rocking ejecting movement to the shaft 12. In other words, the ejecting action of the parts 12 and 18 does not commence until the selecting movement of the ejectors has been completed.

In view of the fact that the operative connection between the cashier or paying mechanism and the adding mechanism is established by means of the disabling hook 64 by a simple depression of the disabling key 61 lowering the arm 58, the hook 64 may be correspondingly depressed and disengaged from the stud 66. When the hook 64 is disengaged from the stud 66, the operation of the main actuator, which is the handle 38, will operate the arm 56 through the intermediate parts described, but the hook 64 will not be actuated and hence the paying mechanism will remain stationary. When the depressed disabling key 61 is released by merely pulling it forwardly to disengage the notch 61′ thereof from the keyboard A, the disabling hook 64 will resume its normal position and thus operatively connect the adding and listing mechanisms, of which the keyboard forms a part, with the paying mechanism, already described in detail.

The formation of the bail 47 is such that when the same has been operated to impart longitudinal movement to a depressed selector bar or bars 20, said bail will assume a position beneath the hooks 48 of the undepressed selector bars and thereby effectively lock from operation those of the keys 29 which have not been operated. The bail 47 thus performs a dual function.

*Indexing means for adding and listing mechanisms.*—Figures 3, 7, 8, 10 and 23 show most clearly the indexing devices operable by the keys 29 to control the differential adjustment of the adding and printing instrumentalities, whereby to add and list, respectively, the amounts equivalent to the numbers on said keys.

The adding and listing mechanism is of the general type comprising adding wheels adapted to be operated by reciprocating adding racks, the latter being connected with type carriers and the movement of said racks and type carriers being differentially controlled by the keys 29, as above suggested. The shaft 39 carries the handle 38 and the forward movement of the latter is limited by the abutment of the cam 40 with a vertical stop lug 67 on the base of the machine. A lateral projection 68 on the frame member 9′ forms the movement limiting means in an opposite direction also by co-operation with said cam. The springs 50 and 51 tend to hold the handle 38 normally at its rear position and on the shaft 39 are loosely mounted a pair of arms 69 having crooked cam slots 69′. In the slots 69′ operate rollers 70 carried by the lower ends of depending arms 71, (see Figs. 8 and 10), which are rigidly secured at their upper ends to a drive shaft 72 supported parallel with respect to the shaft 29, and mounted in bearings in the frame members 8′ and 9′. A tie rod 73 and detent bar 74 connect the lower ends of the arms 71 and the said bar 74 is normally maintained in such a position that it holds depressed, as shown in Figure 7, the rear ends of a plurality of levers 75. The levers 75 are loosely pivoted intermediate their ends upon the shaft 39, and said levers converge toward their rear ends and diverge toward their front ends, see Figure 10. Springs 76 are anchored at one end to the base of the machine and at their opposite or front ends, they are secured to arms 75′ of the levers 75 and are normally under tension to raise the rear end portions of said arms. The levers 75 are maintained in the positions shown in Figure 7 while the machine is at rest, by means of the detent bar 74. A flexible link connection comprising the parts 77 and 78, the latter a spring, is provided intermediate the cam 40 and a lever 79, which is also carried by the shaft 72 aforesaid.

At their front ends, the several levers 75 are provided with forked portions engaging the lowermost of lateral studs 81 on the adding racks 80. The racks 80 are vertically arranged and each rack is mounted to move between a pair of supporting guide plates 82 suitably secured in position on cross rods 83 of the framework. The plates 82 are vertically slotted to receive the studs 81 and ensure proper vertical movement of the racks in relation to the adding pinions or wheels 84, with which the racks are adapted to be engaged.

The adding wheels or pinions 84 are located below a sight opening 85 in the front of the casing of the machine and are mounted on a shaft 86 carried by an accumulator frame 87. Normally the adding wheels are disengaged from the racks 80 but the frame 87 is capable of being shifted or rocked in order to move the adding pinions or wheels 84 into and out of engagement with said racks 80 in a manner to be set forth hereinafter in the detailed description of the adding mechanism.

The racks 80 are stationary at their uppermost positions when the machine is at rest, being held in such positions by engagement of lugs 80′ thereon with flanges 88′ of locking bars 88. One locking bar 88 is provided for each series or row of keys 29, and said bar is formed with cams 88″ engageable by lateral pins 89 located intermediate the ends of the keys 29. For each series or row of keys 29, there is provided a series of index stops 90, which comprise a plurality of superposed sliding plates movable horizontally in guide openings or slots provided in supporting strips or guides 91 suitably attached at their ends to the frame members 8′ and 9′ and arranged transversely with respect to said stops 90. Each index stop 90 has near its rear end a lateral pin 92 entering an inclined cam slot 93 of a corresponding amount key 29, said slot being so disposed that, on depression of a key 29, the index stop 90 of the latter will be moved longitudinally forward into the path of the lug 80′ of the adjacent rack. The said depression of the key, of course, forces the coacting locking bar 88 rearwardly, by the co-operation of the pin 89 with a cam 88″, and this action effects a release of the adding rack 80 from the locking flange 88′, whereby to permit the adding rack to descend at the proper time and engage with the selected and now operative index stop.

At their rear ends, the levers 75 are also forked so as to engage with studs 94 provided at the lower extremities of type carriers 95, the latter consisting of vertical reciprocatory bars formed with longitudinal slots 96 through which supporting and guide rods 97 pass. At their upper ends, the type carriers 95 are supplied with movable indicia type which are used to print amounts corresponding to those selected by manipulation of the amount keys. Suitable impression hammers may coact with the said types of each type carrier to effect recording of the amount on the manipulated keys. The general co-operation between the handle 38, the keys 29, indexing stops, adding and printing means will now be set forth.

When the operator desires to add and list a certain amount, those of the various keys 29 representing said amount are depressed. If a key 29 of each series or row is depressed, all of the locking bars 88 will be moved rearwardly and their locking flanges 88′ disengaged from the lugs 80′ of the racks 80. In other words, the adding racks 80 are in this manner initially released. They do not move because the detent bar 74 is yet maintaining the levers 75 in their normal position. However, as soon as the operator pulls the handle 38 forwardly, the lever 79 will be tilted or rocked through the flexible connection 77—78 and such movement of the lever will correspondingly rock the arms 71 and raise the arms 69 which carry the detent bar 74. The moment the detent bar 74 is released, the springs 76 act on the levers 75 to pull the adding racks 80 downwardly and elevate the type carriers 95. When the keys 29 were depressed, as before stated, each key, of course, moved its co-operating indexing stop 90 into the path of the lug 80′ of the adjacent rack 80 and when the adding racks were released, the lugs 80′ engaged with their preselected index stops and in this manner the extent of movement of the rack 80 and the type carriers 95 was differentially controlled. For instance, if the first key of the units row is depressed, it will set in operative position the uppermost of the indexing stops 90. If the key 3 of the tens row is depressed, the third indexing stop 90 from the top of the series coacting with the tens keys will be moved into operative position. When the adding racks for the keys just mentioned are moved downwardly, the units racks will have one increment of movement, while the tens rack will have three increments of movement.

On the return movement of the handle 38 to its rearward position, the various racks 80 will be raised to assume their normal positions, during which movement the adding wheels or pinions 84 are operated, and the type carriers will also be returned to their normal positions, the impression means having previously acted upon the types adjusted for printing.

*Key lock and release means.*—Vertically arranged within the front portion of the keyboard section are a plurality of pivoted locking plates 98, one of which is provided to co-operate with the superposed index stops of each row of keys, as shown most clearly in Figure 23 of the drawings. The springs 99 are connected with the innermost portions of the locking plates 98 and normally tend to force the outer edge of said plate into locking co-operation with the adjacent stops 90, each of the latter having a lateral rounded catch 100. When the key 29 is depressed, its coacting index stop 90 is cammed outwardly in the manner above described until the catch 100 of said stop is engaged at the inner edge thereof by the adjacent locking plate 98. Should a second key 29 in the same row be depressed, purposely or otherwise, its index stop 90 will engage the locking plate 98 last referred to and release the first mentioned depressed key, permitting the latter to return to its normal position and the newly depressed key to be locked depressed. A flexible keyboard is thus provided for the machine. Arranged to slide transversely of the several locking plates 98, is a key release bar 101, having the inwardly extending hooks 101′ arranged to engage and impart pivotal movement simultaneously to all of the locking plates 98. The bar 101 is at the front extremity of the keyboard section and is operable by an "Error" key 102, arranged at the right hand side of the keyboard. As shown clearly in Figure 20, the "Error" key 102 is provided at its lower portion with a flange or cam 102′ and a pin 103 forms a guide and attaching member for the key 102 in an obvious manner. The cam 102′ of the key 102 is arranged to engage a swinging release bail 104 pivoted to a shaft 105 and extending rearwardly from the front portion of the keyboard section at the right hand side. The front leg of the bail 104 is adapted to engage the right hand end of the release bar 101 and thus, it will be apparent that, on depression of the "Error" key 102, the bail 104 will be swung to the left, imparting longitudinal release movement to the bar 101 and operating all of the locking plates 98 which have assumed locking positions in respect to any of the index stops 90. The various keys 29 are, in the above manner, simultaneously released. It is necesary, of course, that the bail 104 shall be operated from the main actuator 38 in order that, upon the completion of an operation of the machine by said actuator, the keys 29 may be restored to their normal position. With the above in view, the uppermost arm 72′ of the lever 72, shown in Figure 18, has an inwardly extending stud 72ª thereon for co-operation with a release lever 106 pivotally mounted on the frame at 107 and carrying at its upper end a pawl 108. A spring 109 tends to pull the lever 106 rearwardly in a position in which the lever normally rests against the stud 72ª. On initial movement of the actuating handle 38 the arm 72′ of the lever 72 moves rearwardly, permitting the spring 109 to carry the release lever 106 in the same direction, the pawl 108 riding over the pin 104′ on the inner end or leg of the bail 104. On the return stroke of the handle 38, the stud 72ª forces the release lever 106 forwardly and the pawl 108 by a sort of cam action against the pin 104′ of the bail 104, swings said bail to the left, and imparts movement to the release bar 101, thereby permitting the keys 29 depressed to perform a transaction, to return to their uppermost positions. The pawl 108 has a stop 108′ that abuts with the lateral curved upper end of the lever 106 so that said pawl will not yield on the forward movement of the lever, ensuring a proper movement of the release bail 104.

While describing the release bail 104 it may be noted that said part has an additional function in reference to its co-operation with the "Total" and "Sub-Total" keys 110 and 111, respectively. The keys 110 and 111 are mounted in the frame of the keyboard in a manner similar to the "Error" key 102, being also guided by attaching and guiding pins 103. The said keys 102, 110 and 111 have springs 112 connected therewith to hold them upwardly retracted. The key 110 has a lateral locking flange 110′ and the key 111 has a similar flange 111′, said flanges being adapted to be engaged by the bail 104 when either of the "Total" and "Sub-Total" keys is depressed, whereby to lock said key in such position. A stud 110ª on the key 110 and a stud 111ª on the key 111 project laterally and are adapted to engage respectively, cams 113 and 114 which are formed on a shifting bar 115 which is arranged transversely in respect to the keys 110 and 111. The bar 115 has a pin and slot connection 116 at its front end with the frame of the machine and at its rear end, said bar is pivotally connected with a side of a swinging bail 117. The bail 117 has the sides 117′ and, the cross piece of the bail is interlocked, as shown in Figure 7, with the several locking bars 88 for the keys 29. Having in view the foregoing, it is obvious that by depressing either of the keys 110 and 111, the shifting bar 115 will be moved rearwardly, swinging the bail 117 in a corresponding direction and simultaneously moving rearwards all of the locking bars 88 until shoulders 88ª of said bars engage beneath the lateral pins 89. In the above manner therefore, the keyboard including the amount keys 29 is locked against operation whenever the "Total" or "Sub-Total" key is depressed.

Still another special key, the 'Repeat" key, 118 is provided in the keyboard, is normally upraised by a spring 119, and is formed with a lateral arm 120 having a stud 120′. On depression of the key 118, the stud 120′ assumes a position abutting with the rear side of the release lever 106 so that when the handle 38 is operated to carry the arm 72′ of the lever 72 rearwardly, the release lever 106 cannot move to perform its usual release operation, whereupon the previous transaction set up in the machine will be repeated in a manner readily apparent.

*Accumulating and transfer mechanism.*— Referring particularly to Figures 13 to 17, inclusive, the accumulating mechanism of the machine consists of the frame 87 which is pivotally supported by upright rocker arms 121 carried by a rock shaft 122. The frame 87 consists of a number of upright division plates 123 united by suitable tie members. Between the division plates 123 are mounted the adding wheels and pinions 84 hereinbefore referred to. The end plates of the accumulator frame 87 have forwardly projecting extensions 87′ at their upper extremities, which latter are forked so as to receive the transverse guide bar 124. By rocking the arms 121 inwardly or outwardly, engagement and disengagement of the adding pinions or wheels with the adding racks 80 may be effected, and at the outer sides of the adding wheels are arranged the carrying racks 125, the same being provided with teeth at their upper ends and said ends being also bifurcated to be engaged with and guided by the guide bar 124. At its lower end, each carrying rack 125 is bifurcated to engage over a stud on the front end of a carrying lever 126. The carrying or transfer mechanism includes primarily the carrying racks 125, their carrying levers 126, tripping and totaling pawls 127, each of which is mounted between adjacent division plates on the frame 87, and latches 128 pivotally mounted between the adjacent pairs of guide plates 82. The carrying levers 126 are pivoted between their ends upon a shaft 129 located just beneath the shaft 122. A detent bar 130 is arranged transversely of the keyboard, just beneath the carrying racks 125 and is supported by a pair of arms 131, which are rigidly mounted on the shaft 129 before mentioned. Said shaft 129 is adapted to move the detent bar 130 by an arm 132, shown in Figures 30 to 33, and in conjunction with means to be hereinafter more fully described.

Exemplifying the general operation of the transfer mechanism, it will be noted that if the number "99" is set up on the keyboard, the units and tens adding wheels will rotate until the dials thereof show "99" at the sight opening 85 of the machine. No transfer has yet taken place but the carrying cam 133 on the units adding wheel is advanced nine spaces and occupies a position ready to trip the pawl 127. If the number "7" is set up on the keyboard and the machine operated, the said carrying cam 133 will depress the pawl 127, as shown in Figure 15, said pawl 127, through its lateral extension 127', tripping the latch 128 and causing the foot 128' of said latch to be disengaged from the tens carrying lever 126. Ordinarily, were no means provided to prevent such action, the tens carrying rack would now descend one space. However, the adding pinions at this period of the operation are in engagement with the adding racks 80 and not with the carrying racks 125 so the carrying operation must be temporarily delayed, for which purpose the detent bar 130, previously referred to, is provided, the same at this point in the operation of the parts assuming the position shown in Figure 15, and holding the carrying racks 125 in their uppermost positions. As will be seen from Figure 17, the stud on the front end of the carrying lever 126 is normally at the upper end of the slot or bifurcation in the lower end of the carrying rack 125 and a spring 125ª connects the parts 125 and 126 and is sufficiently strong to cause a gravitating movement, but weaker in tension than a second spring 134 which connects the inner end of the carrying lever with a tie plate 135. In the example cited above, as soon as the carrying cam 133 trips the pawl 127, the stud of the carrying lever takes up the lost motion in the carrying rack and the stop 131' of the carrying lever moves in front of the stud 128ª of the latch foot 128'. The parts are now ready to complete the carry when the detent bar 130 is lowered to assume the position shown in Figure 16, such movement permitting the tens carrying rack 125 to descend a distance equal to the length of one tooth, thereby rotating the tens adding wheel one tooth to cause the latter to transfer from "9" to "0" on the dial at the sight opening 85. Of course, in the above operation, the tens wheel in transferring will trip the carrying rack of the hundreds wheel, allowing the pinion of the latter to advance one tooth—with this difference that in the second case, the carry or transfer will not be held up since the transfer has taken place after the pinions have engaged their carrying racks. Figure 16 shows the last described action and the completion of the transfer operation will display the indication "106" at the sight opening 85.

*The general control mechanism.*—The co-operation of the adding racks 80 with the adding wheels or pinions 84 is closely analogous to the equivalent action of those adding machines of the same type as the present improvements. Thus in relation to the rocking of the frame of the accumulating devices to cause engagement of said devices with the adding racks, for operations of addition, totaling, and sub-totaling, the time of such co-operation is different, being that ordinarily employed in this special type of adding mechanism. For the purpose of addition, the adding racks 80 are engaged with the adding pinions as said racks start on their upward movement. For the sub-totaling operation, the racks 80 are engaged with the adding pinions 84, both on the descending and ascending movement of said racks, while for totalizing, when the machine is, of course, cleared, the adding racks are engaged with the pinions 84 at the outstart of the downward movement of said racks.

The control means for the above operations is clearly illustrated in Figures 8 and 9, wherein it will be observed that the rock shaft 122 carrying the accumulating section has an operating arm 136 which is connected by a link 137 with an approximately triangular-shaped controlling lever 138.

The uppermost arm of said lever 138 is pivotally attached to the link 137 and the two lowermost arms of said lever designated 138' and 138" are hook-shaped and provided with cams 139. The lever 138 is pivoted at 140 and has lateral studs 141 and 142 projecting therefrom for co-operation under predetermined conditions with a wipe pawl 143, which is pivotally mounted at the upper end of the arm 72' of the lever 79. Engaging the rear end of the lever 138 is a detent 144 maintained in such engagement normally by a spring 145 to thereby hold the control lever 138 against displacement during the normal operation of the machine. A stud 146 on the lower end of the detent 144 is adapted to ride along the upper surface of a lateral arm 79' of said lever 79, locking the accumulating section against displacement during such co-operation.

As the machine operates in adding, it will be apparent that upon the forward stroke of the handle 38, the wipe pawl 143 will be carried rearwardly with the arm 72' of the lever 79, and a roller 147 on the arm 72' will engage the cam surface 139 of the arm 138'', thereby tilting the control lever 138 and rocking the tilting arm 136 to the rear. The movement of the arm 136 carries the accumulating wheels or pinions into mesh with the racks 80 and such meshing relation is maintained until the handle 38 returns to its normal position, restoring the arm 72' to its corresponding position and rocking the control lever 138 so as to assume its normal position through engagement of the roller 147 with the cam 139 of the arm 138'.

The "Total" key 110 has a stud 148 adapted to engage the front end of a lever 149, the rear end of which lever has a stop 150 arranged adjacent to the arm 138'' of the control lever 138. Intermediate its ends, the lever 149 has a lateral stud 151 adapted to engage a cam extension 152 upon an auxiliary lever 153 pivoted between its ends just below the lever 149. The front end of the lever 153 is engageable by a stud 154ª near the lower end of the "Sub-Totaling" key 111, and the rear end of the auxiliary lever 153 is proximate to the arm 138' of the controlling lever 138 and adapted to constitute a stop having a function equivalent to that of the stop 150. Normally the springs 154 and 155 co-operate with the levers 149 and 153, respectively, to hold the latter in their normal positions. In the totaling operation, the "Total" key 110 will be depressed and thereby depresses the front ends of the levers 149 and 153. This action raises the rear ends of the levers aforesaid and permits movement of the pawl under the influence of the spring 156 so that as the handle 38 is drawn forwardly carrying the lever arm 72' rearwards, the pawl 143, which is double-acting, will engage the stud 141, tilting the accumulating devices 84 into mesh with the racks 80. Furthermore, as the lever arm 72' starts to return to its normal position, while the handle 38 is doing the same, the pawl 143 is free to engage the stud 142 and tilt the accumulating devices out of mesh with respect to the racks 80. By this means, the accumulating devices are engaged with the racks only on the downward movement of the latter. In obtaining a sub-total, since depression of the key 111 depresses only the lever 153, the pawl 143 will act to rock the accumulating devices into engagement with the racks 80 as the lever arm 72' moves rearwardly. Since the stop 150 has not been raised, the pawl 143 will not coact with the stud 142 and therefore the accumulating devices and racks aforesaid will remain in engagement until the operation of the machine is completed, as is necessary in obtaining a sub-total.

*Transfer control mechanism.*—The parts of this mechanism are shown primarily in Figures 30 to 33, inclusive, and comprise a depending pivoted lever 157 connected at its lower end by a link 158 with the arm 132 of the shaft 129 which carries the detent bar 130. The arm 132 is adapted to assume three different positions in restoring the transfer or carry-over mechanism, said positions being illustrated in Figures 30, 32 and 33. In Figure 30, the parts are shown in the positions occupied thereby when the machine is at rest after the operation. Figure 32 shows the parts in their relation when the handle 38 is at the end of its forward stroke, the carrying racks 125 being raised above their normal positions in order to enable the part 128ª of the foot of the latch 128 to engage over the adjacent end of the carrying lever 131. In Figure 33, the parts are in the positions taken thereby immediately after the handle 38 starts upon its return stroke, at which time the carrying racks have again become meshed with the adding pinions or wheels 84, the normal condition.

Loosely mounted upon the shaft 72 is a latch 159, the rear end of which has a catch 159', to engage a lateral pin 160 on the depending lever 157. The shaft 72 aforesaid also carries for movement therewith the full-stroke sector 161, coacting with the full stroke pawl 162 in a well-known manner, and a lateral stud 159'' on the front end of the latch 159 is adapted to be engaged by the front edge of the sector 161. The rear edge of the sector 161 is capable of engagement with a stud 163 carried by the forward extension of the lever 157. A spring 164 connects the parts 158 and 159 and normally tends to hold the latch 159 with its stud 159'' engaging with the sector 161, as shown in Figure 30.

It will be apparent that as the handle 38 is drawn forwardly, the sector 161 moves rearwardly until it engages with the stud 163 of the lever 157, whereupon the several carrying racks 125 and carrying levers 131 are restored. When the sector 161 moves the lever 157 rearwardly, the catch 159' of the latch 159 engages over the pin or stud 160 and prevents movement of the carrying racks, thereby retarding the carrying operation until the return movement of the handle 38, or until said handle reaches the extreme end of its return stroke, at which time the latch stud 159'' will be tripped by the sector 161, raising the catch 159' and permitting the spring 164 attached to the link 158 to pull upon said link, rock the arms 132 and lower the detent bar 130. Said lowering movement of the detent bar 130 permits a similar movement of the carrying racks 125 and carrying or transfer action of the same if the accumulating devices are ready for such transfer.

At its upper end the sector 161 carries a stud 165 which engages with the bifurcated lower end 166' of a lever 166 which co-operates in a peculiar manner with the printing mechanism as will now be more fully described.

*Printing mechanism.*—The type carriers of the printing mechanism have heretofore been referred to as consisting of vertically movable type bars 95 arranged in the rear portion of the keyboard section of the machine, said bars being supplied at their upper ends with the spring retracted type members 95', each type member carrying a type face at one end and having its other end arranged to be impinged by suitable impression means in the form of a type hammer. The type faces of the type members 95' are numbered from 1 to 9 consecutively and the uppermost type member has a cipher indication, as shown in Figure 26. The printing mechanism is best shown in Figures 7, and 24 to 29, inclusive, and each type bar is provided at its upper portion with an encasing plate 167 interlocked at its upper extremity, as shown at 167', with lugs 167'' on the upper extremity of the type bar, the parts 95 and 167 being attached together by screws or other fastenings, as shown at 168. Flanges on the edges of the type bar 95 are cut out to form guide portions 169 for the type members 95' and the springs 170 coacting with the members 95' are housed between the encasing plate 167 and the body of the type bar 95, as show most clearly in Figure 28 of the drawings.

A set of type bars 95 of a number corresponding with the number of rows of amount keys 29 of the keyboard is provided and with said type bars is associated a set of hammers 171 for striking the type members 95', a set of hammer drivers 172, each connected with the adjacent hammer, a set of catches 173 of hook-like form for normally restraining the hammers under tension, and a set of springs 174 connected with the hammer drivers. The above mentioned parts are primarily supported in a frame consisting of sides 175 and 176, the lower portions of which are connected by tie rods 177 and 178. Said frame for the printing devices is rockably mounted on a shaft 179 and the left side 175 of the frame has an upwardly extending arm 180 above the shaft 179. The rod 177 constitutes an axis for the various catches 173 which are adapted to engage over lugs 181 on the coacting hammer drivers 172. The rod 178 has connected thereto a set of springs 182 which are attached also to the catches 173 and normally tend to force the latter into engagement with the squared lugs 181. Each hammer 171 has a head at its upper end to impinge with the adjacent end of any type member 95' of the co-operating type carrier or bar 95 and at its lower end the hammer is loosely pivoted upon the shaft 179. Each hammer driver 172 is also pivoted on the shaft 179, the lower end of the driver being connected with its spring 174, the upper end of the driver having ears 172' between which the body of the co-operating hammer is loosely engaged, and the intermediate portion of said part 172 being adapted to abut with the stop bar 183. There is therefore some lost motion between the ears 172' of the driver 172 and the hammer 171 engaged thereby, to provide for the rebound of the hammers after impact with the type members 95', the liability of blurring being thus obviated. The arm 180 of the hammer supporting frame is connected by a driving link 184 with an arm 185 of a rock shaft 186, to which shaft 186 the lever 166 before referred to is connected. A dash pot 187 or equivalent retarding device is arranged at the left of the printing mechanism, being supported upon a cross rod 188 of the frame of the machine, the plunger rod of the dash pot being attached at its upper end to a cross bar 189 mounted on rocker arms 190 attached to the shaft 186. A suitable platen 216 is arranged to co-operate with the printing members 95' of the type carriers 95 and the tails or lower ends of the catches 173 are split to provide laterally extending stops 192, each projecting in front of the tail portion of the next adjacent catch to the left, whereby the cipher type members 95' of type carriers 95 not operated by adjustment of the keys 29, will be printed on operation of the impression means.

With the above description in view, and bearing in mind that each type carrier 95 has an abutment 95$^a$ at its front edge to be engaged by the tails of the catches 173 when the latter are rocked with the hammer frame rearwardly, and when the type carriers are not in their zero positions, the operation of the mechanism will be clearly understood from the following:

During the initial movement of the handle 38, those type carriers 95 which are indexed for any number above zero, will be elevated to the printing point, after which the frame 175—176 will be rocked slightly rearwards until the tails of predetermined catches 173 engage with the abutments 95$^a$ of the elevated type carriers. Such engagement will tilt the catches 173 from the studs 181, thereby releasing the hammer drivers 172 of such catches and permitting the hammers 171 of said drivers to be fired, or operated against the previously adjusted printing members 95'. The provision of the dash pot retarder 187 governs the speed of the machine, preventing scattering of the type and violent manipulation of the handle 38. When the frame 175—176 of the printing devices is rocked back to its normal position, the catches 173 will be re-engaged with the studs 181 of the hammer drivers 172 and locked until another transaction of the machine is performed.

As shown in Figures 25 and 26, a duplicate printing mechanism is provided and consists of auxiliary type carriers $95^x$, each of which is connected with the corresponding one of the main type carriers 95. To establish such connection, a plurality of gear shafts 193 are provided in superposed relation upon a suitable frame 194. There are two gears 195 on each shaft 193, said gears meshing with gear teeth 196 on the rear edges of the corresponding type bars 95 and $95^x$. That is to say, the gears 195 of the lowermost shaft engage with the units type carriers 95 and $95^x$ of the main and auxiliary printing mechanisms. The gears of the next shaft 193 engage with teeth on the rear edges of corresponding tens type bars of the two printing mechanisms, and so on. By reason of the intergearing of the type carriers or bars of the two printing mechanisms, whenever one of the type carriers 95 is indexed at a predetermined adjustment on movement to such adjustment its corresponding type carrier $95^x$ will be simultaneously adjusted. The other printing instrumentalities co-operating with the type carriers $95^x$ are identical with those co-operating with the type carriers 95 so the operations of the main and auxiliary printing mechanisms are simultaneous and capable of making a list or record in duplicate, which is often desirable for the printing of a check or slip placed in the machine and for printing a recording strip, which is constantly passing through the machine.

*Ribbon reverse mechanism.*—As shown clearly in Figures 34 to 39, inclusive, of the drawings, the printing ribbon 197 is connected with spools 198 and 199 supported on brackets 200 and 201 respectively, the latter being fastened to the inside of the frame members 8' and 9' at their upper rear ends. The spools 198 and 199 are of conventional form, their upper disks being toothed in opposite directions. The operation of the ribbon mechanism in reversing is entirely automatic. Arms 202 and 203 are provided respectively for the spools 198 and 199, to carry the feeding pawls 202' and 203', respectively. The pawls aforesaid are adapted to engage the teeth of the spools with which they co-operate, the arms 202 and 203 being pivoted to the axes of the adjacent spools and being connected by a drive link 204. The link 204 has a lateral stud 205 engaged with the upper arm of a bell crank 206 vertically arranged on the frame work of the machine, said bell crank having on its lower arm a stud 207 engageable by notches 208 and 208' of a pull rod 209. The pull rod 209 is connected pivotally at its lower end with an arm 210 mounted on the selector bar operating shaft 46 previously referred to. A spring 211 co-operates with the pull rod 209 to normally maintain one or the other of the notches 208 and 208' engaged with the stud 207. For each spool there is provided a pivoted retarding finger 212, yieldingly engaging the spool under the action of a tension spring 213. The brackets 200 and 201 are each formed with a cam 214 on the inner curved edge 215 thereof. The feeding pawl 202' has a downwardly projecting pin $202^a$ and the pawl 203' has a similar pin $203^a$. It may be stated that the drive link 204 is reciprocated by the parts 46 and 209 in order to impart feeding movement to one of the spools 198 and 199 and with which it may co-operate at a predetermined time. As shown in Figure 34, the pin $202^a$ of the feeding pawl 202' is maintained in contact with the curved edge 215 of the bracket 200 and while in such contact, said pawl is operatively engaged with the teeth of the spool 198. At the same time as shown in Figure 34, the pin $203^a$ of the feeding pawl 203' by reason of the position of the link 204, is held in engagement with the cam 214 of the bracket 201. Since the cam 214 is formed on an arc more remote from the axis of the adjacent spool than the edge 215 of the bracket, said cam is adapted when engaging the pin of either feeding pawl to maintain said pawl out of engagement with the teeth of the co-operating spool. Therefore, as the parts are shown in Figure 34, the inking ribbon 197 is fed from the spool 199 to the spool 198 in the motion of the link 204 because the pin $202^a$ is in contact with the edge 215 of the bracket 200 and the pawl 202' is engaged with the teeth of said spool 198. On the other hand, the feeding pawl 203' during the movement of the link 204, is inoperative in relation to the teeth of the spool 199.

It will be apparent that in order to reverse the movement of the ribbon 197 it is only necessary to reverse the operative relation of the pawls, as shown in Figure 34 in respect to their adjacent spools. The ribbon 197, of course will continue to feed on to the spool 198 according to the illustration in Figure 34 until the terminal of the ribbon attached to the spool 199 is exposed and causes the ribbon to be placed under tension on the downward stroke of the pull rod 209. The tension on the ribbon momentarily prevents movement of the bell crank 206 and causes the stud 207 to slip from the notch 208, as shown in Figure 35, into the notch 208', as shown in Figure 38. It will now be apparent that in the further operations of the machine, the bell crank 206, through the action of the pull rod 209 will cause the drive link 204 to travel in a path somewhat to the left of that in which it will travel, according to the showing of Figure 34, and the new path of movement of the link 204 will maintain the feeding pawls 202' and 203' in the reverse positions shown in Figure 39 and cause the pawl 203' to rotate the ribbon spool 197 and feed the ribbon in a direction opposite to that in which it is feeding in Figure 34.

*Platen feed mechanism.*—The mechanism for feeding the roller platen 216 is shown clearly in Figure 27 and certain parts are illustrated in Figures 7 and 26 also. The platen 216 is arranged above the paper spool 217 which carries the roll of paper 218 that constitutes the recording strip incidentally referred to hereinbefore. Mounted upon the axis 219 of the spool is an angle lever 220, the lower arm of which is formed with a cam 221 arranged to be engaged by the arm 180 which rocks with the hammer frame. The other arm of the lever 220 is approximately vertical and carries at its upper end a roller 222 which operates in a cam slot 223 of a feed lever 224 pivoted to the axis of the platen 216. Pivoted to the lower outer portion of the feed lever 224 is a spring actuated feeding pawl 225 adapted to engage at one end with a toothed disk 216' attached to an end of the platen, the other end or tail of the pawl being engageable by a lateral pin 226 on the vertical arm of the angle lever 220. A pivoted pressure finger 227 is mounted above the lever 220 and a spring 228 holds said lever in engagement with a star-wheel 229 on the right hand end of the platen 216, the part 227 preventing over-rotation of the platen. A feeding roll 230 co-operates with the platen and the recording strip 218 in the well-known manner and a lever 231 is arranged to be manipulated to release the feed roll from operative engagement with the strip 218 for adjustment of the latter or other purposes.

With the arrangement of parts in view as above set forth, it will be apparent that on the forward movement of the arm 180, the cam 222 moves downwardly, permitting the lever 220 to be tilted by the spring 233 connected therewith. Such movement of the lever 220 imparts upward movement to the feed lever 224 and the pawl 225 carried thereby, this action raising the pawl preliminary to engagement of the same with the next tooth of the feed disk 216' on the platen. The above operation takes place as the handle 38 moves forwardly and on the return stroke of the handle 38, the feed lever 224 is depressed, feeding the platen forward to a predetermined point and correspondingly feeding from the machine a section of the recording strip 218. The feeding of the platen being completed through the action of the lever 224, the final lowering movement of said lever causes engagement of the tail of the feeding pawl 225 with the pin 226, thereby tilting the pawl from engagement with the disk 216' and permitting the platen to be turned in either direction at the will of the operator.

*Change keys.*—Certain change keys 29' have been referred to before and, as shown in Figure 2, are preferably four in number and located at the upper end of the bank of amount keys 29. A series of selector bars 20' are especially provided for the set of change keys aforesaid. The change keys 29' are designed to afford manipulative devices for the purpose of selecting change comprising pieces of money of different denominations to be exchanged for an amount of equivalent value paid to the operator of the machine. As in the case of the denominational keys, a transaction of this nature does not represent an amount paid out of the machine for which an equivalent amount is not received and is a transaction by way of exchange of money purely and simply. For the above reason, it is designed that the change keys 29', while they operate the paying mechanism practically in the same manner as the amount keys 29, shall not, however, list or record on the strip 218 the transaction performed thereby. Thus, the change keys, as more clearly shown in Figure 7, are not capable of controlling the operation of the indexing means comprising the stops 90 and locking bars 88 which release the adding racks 80. The bars 88 adjacent to the several change keys 29' do not have cams 88'' for co-operation with the keys 29' and such as are provided for enabling the keys 29 to shift said bars 88 rearwardly. Under the above conditions, when one or more of the keys 29' are depressed, there will be an operation of the selecting means of the paying or money section of the machine but the actuation of the handle 38 will operate only the ejectors since, though the bar 73 is upraised, the adding racks remain in their normal locked positions.

Figure 4:
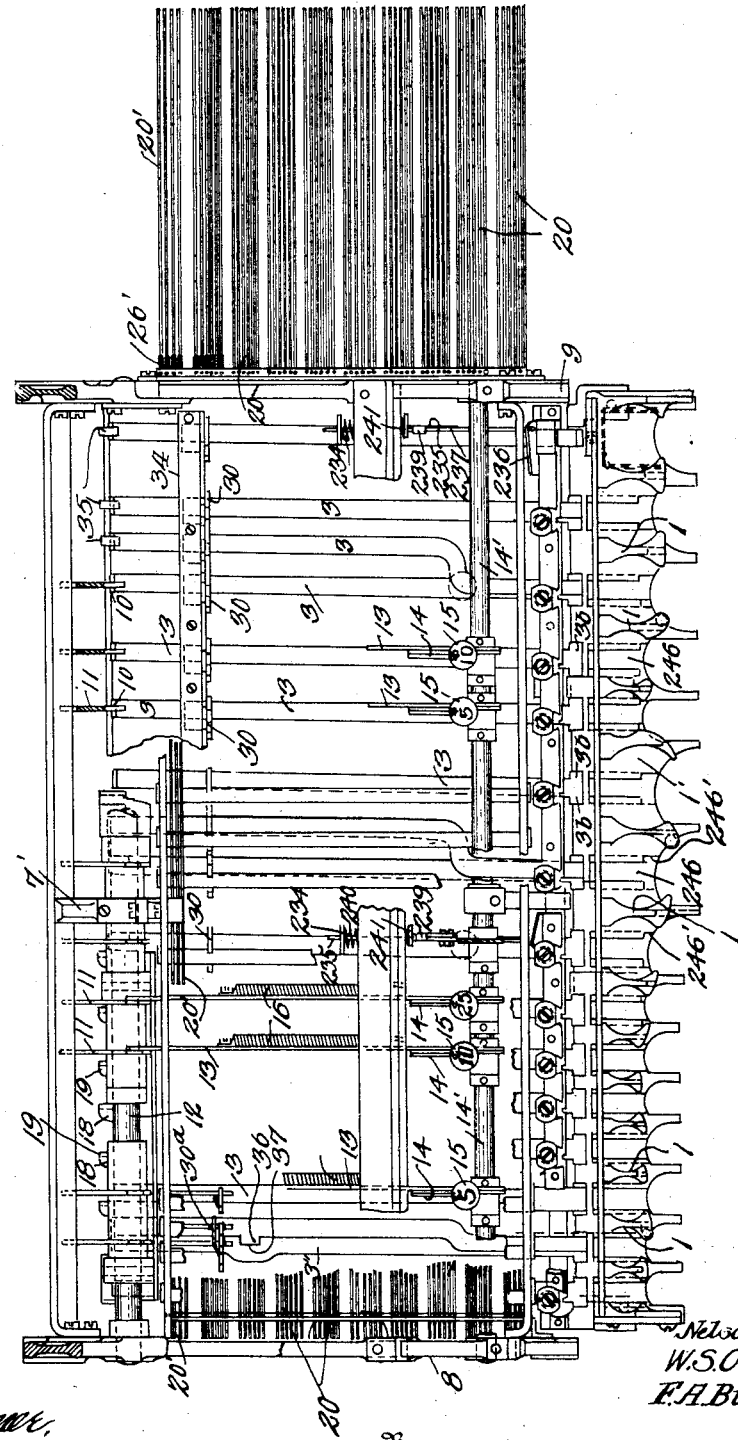
Figure 4 is a top plan view showing more particularly the cashier section of the machine, certain parts being broken away to illustrate clearly the ejector devices, the arrangement of the denominational keys, the coin receptacle, replenishing signal and other associated details of this portion of the machine.
Figure 6:
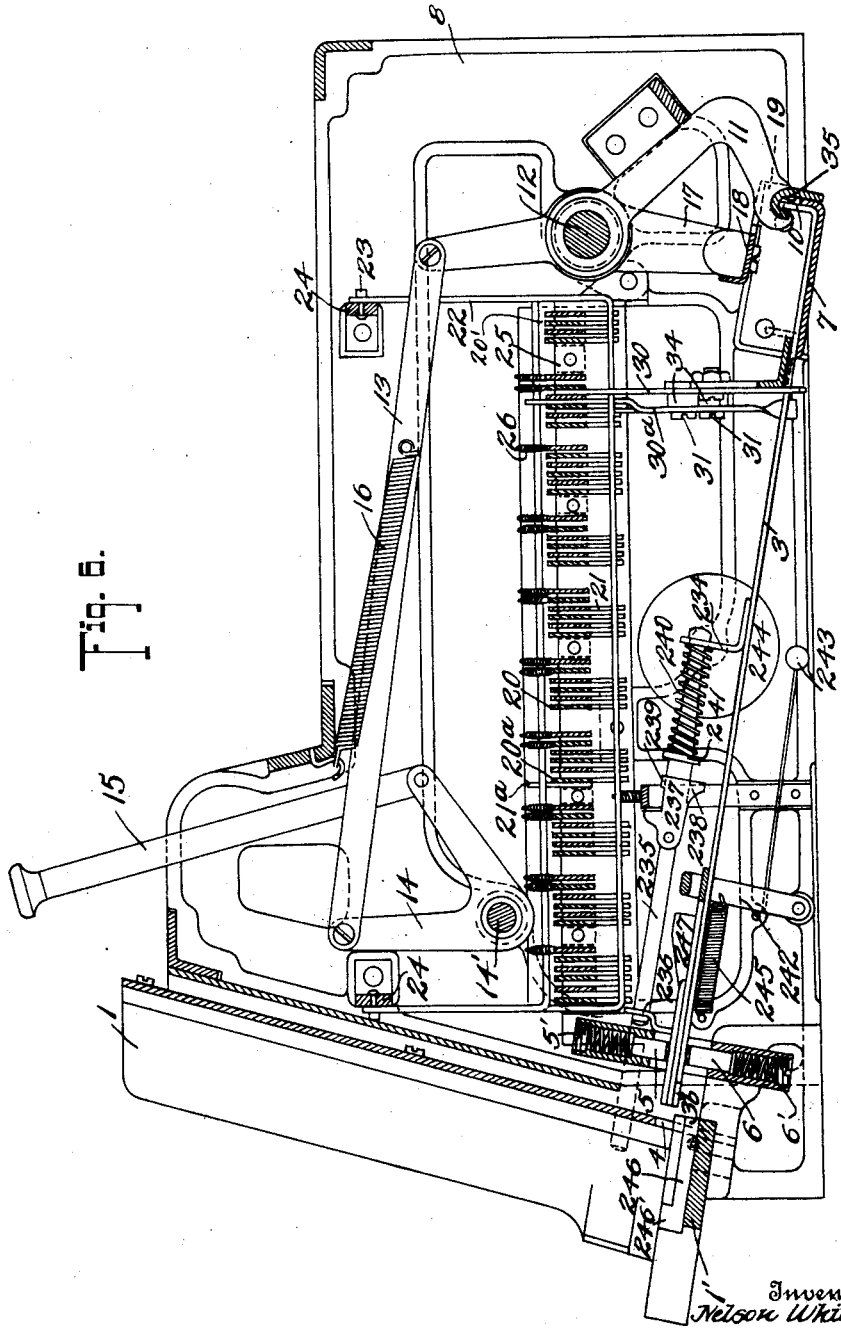
Figure 6 is a transverse sectional view taken through the cashier section and illustrating very clearly the coin receptacle replenishing signal and denominational keys.

*Replenishing signal for cashier mechanism.*—As premised herein, it is contemplated to provide for each of the coin or money receptacles 1 a signal or alarm device that will automatically operate to inform the operator that the contents of one or more receptacles has been diminished to an extent requiring replenishment of the supply of coins or money in said receptacles. As shown in Figures 4 and 6, each ejector 3 has mounted thereon a bracket 234 in which one end of a flat plunger 235 is adapted to slide, the opposite end of said plunger being movable through a guide opening in a transverse guide plate 236 supported by the frame members of the cashier section. The said plunger 235 has a pivoted dog 237 having a depending lug 238 and normally held in its position as shown in Figure 6, by a projection or ear 239 which overlaps the upper edge of the plunger 235. A light coiled spring 240 encircles the inner end of the plunger 235 and bears at one end against the bracket 234 and at the other end against a shoulder 241 on the plunger, thereby holding the plunger 235 normally at the limit of its forward movement. A bail or equivalent operating device 242 is pivoted to the base of the machine and has its transverse bar arranged in the path of movement of the lug 238 of the dog 237, and a tapper 243 is carried by the bail and arranged for co-operation with a bell 244 carried by one of the end frame members of the cashier section.

The action of the signalling means above described is as follows: In the normal operation of the machine, as the ejectors 3 are moved forwardly in their discharging movement, the plunger 235 moves with the ejector and passes through an opening in the rear wall of its adjacent coin receptacle 1 into engagement with the coins in said receptacle. As soon as the plunger 235 engages the coins, the ejector 3 continues its ejecting movement and the movement of the plunger is retarded so that the lug 238 of the dog 237 does not engage over the front portion of the bail 242. Should the coins in the receptacle 1 have been diminished so that the stack of coins is lower than the plane of movement of the plunger 235, it will be apparent that in a discharge movement of the ejector 3, the plunger 235 will pass freely through the opening in the rear wall of the receptacle 1 and the lug 238 of the dog 237 will drop over the bail 242 at the front side of said bail. Then, when the plunger 235 is moved back to its normal position with the ejector 3, the dog 237 will trip the bail 242 and cause the tapper 243 to sound the bell 244, notifying the operator of the condition of the coins in a predetermined coin receptacle or coin receptacles. A spring 245 coacts to hold the bail 242 in its normal position.

*Friction relief means for ejectors.*—As shown particularly in Figures 4 and 6 of the drawings, the front end of each ejector 3 is formed with lateral extensions 3$^b$ and the base 1' of each coin receptacle 1 is formed with a groove 246 of inverted T-shape in cross section and provided with a mouth or entrance 246' of a width corresponding to the width of the ejector and its extensions 3$^b$. As the ejector moves outwardly to discharge a coin from the receptacle 1, the extensions 3$^b$ ride on the upper surface of the base 1', spanning the groove or slot 246 until the extensions 3$^b$ reach the entrance or mouth 246' of said groove, whereupon the upper plunger 5 engaging the ejector 3, and hereinbefore referred to, forces the members 3$^b$ downwardly into the mouth of the groove 246. The tension of the spring 5' which co-operates with the plunger 5 was increased during the outward movement of the ejector by the engagement of a cam 247 on said ejector with said plunger. Thus, on the return movement of the ejector, the parts 3$^b$ travel in the groove 246 so that the outer end of the ejector is relieved of the weight of the coins in the receptacle 1 and which weight is primarily carried by the base of the receptacle. As the ejector resumes its normal position, the cam 247 moves away from the plunger 5 and the plunger 6, the spring 6' of which is of greater tension than the spring 5', elevates the ejector at its front end into its normal position ready to travel out again into the receptacle 1 above the base of the latter. The ejector is maintained in the position shown in Figure 6 by reason of the fact, as above suggested, that the lower plunger 6 is operated upon by a spring of greater tension than that co-operating with the upper plunger 5.

*General operation of entire machine.*—Before giving a complete summary of the operation of the invention, it may be noted that on the return stroke of the handle 38, the detent bar 74 picks up, so to speak, the levers 75 and restores the same, the adding racks 80, and the type carriers 95 and 95$^x$, to their normal positions. The "Total" and "Sub-Total" keys are adapted to actuate the key release bail 104 when the former are depressed in order to throw out an item from the keyboard when either of said keys is operated. The cam slots 69' in the arms 69 are peculiarly formed at the rear and forward ends so that in the operation of the machine, the adding racks will be maintained stationary while the adding wheels or pinions are engaging or disengaging in respect thereto.

In using the invention as a money paying, an adding and a listing machine, the various parts being in their normal positions, should it be desired to pay out a predetermined amount, the amount keys 29 representing such amount, will be depressed. Certain of the selector bars 20 corresponding with said depressed keys 29 will now be lowered into the path of movement of the selector actuating bail 47, and certain index stops 90 will have been adjusted by their co-operating depressed keys 29. The operator now pulls the handle 38 forward, the initial movement of the handle, through the connections shown in Figure 11, operating the depressed selector bars to set their ejectors in operative connection with the ejecting bar 18, and the same movement of the handle in its forward stroke causing the indexed adding racks 80 to move downwards and the corresponding type carriers 95 to move upwards until said parts reach their differential adjusted positions. As the adding racks and type carriers are being adjusted in the above manner, the ejectors are being operated to deliver from the receptacles 1 the amount set up on the machine by the keys 29 which were depressed. Just prior to the final movement of the handle 38 completing its forward stroke, the hammer drivers are fired to complete the operation of the listing or printing mechanism. The parts of the ribbon feeding movement are actuated at the proper time to feed the inking ribbon 197 to present a fresh portion thereof to the printing point of the type members, and the platen feeding devices are correspondingly operated to perform their proper functions. At the time the hammers are operated, the adding wheels are drawn into engagement with the adding racks 80 and on the return movement or stroke of the handle 38, the several levers intermediate the adding racks and type carriers are restored to their normal position, and the said adding wheels are rotated a predetermined number of teeth, as controlled by the indexing mechanism of the keyboard. Of course, the full stroke sector 161 with its pawl 162 compels a complete operation of the machine once the operator has started to pull the handle forwards.

A depression of the "Non-Pay" key 61 will render the disabling hook 64 inoperative with respect to the main actuating shaft and handle 38 of the machine and when the latter are operated, the adding and listing mechanism will add and list the amount set up by the keys 29 but the cashier section of the machine will be inactive during such operation. If any one or more of the change keys 29' are actuated, the adding and listing devices remain inactive but the cashier section of the machine will pay an amount equivalent to that represented by the change keys.

If one or more of the denominational keys 15 are each operated one or more times, a coin will be delivered by each key on each depression thereof, but such operation will not influence in any way the parts of the adding and listing section of the machine.

Should it be desired to separate the adding section of the machine from the cashier section, since said sections comprise mechanisms mounted in complete separate frames, the detachment of the respective sections aforesaid may be readily accomplished, after which the cashier section would be useful for denominational paying of money. Of course, the denominational keys 15 could be operated to discharge from the machine different coins within a certain range of value but only one coin can be ejected on a single operation of each denominational key. This matter is merely referred to, to show the range of availability of the cashier section when disabled or entirely detached from the adding and listing section of the machine. The adding and listing section when separated from the cashier section bodily is a complete machine and fully capable of performing its regular functions in a manner which will be readily apparent.

It is not believed necessary to further describe the operation of the "Error", "Total", and "Sub-Total" keys, as the purpose and functions of said parts are already fully disclosed.

Since the printing or listing mechanisms in duplicate are provided, one of said mechanisms will record transactions of the combined machine, or the adding and listing machine alone on the recording strip, while the other mechanism is capable of listing such transactions upon a slip, check or other member placed in the guide 233.

As shown best in Figure 7, springs 248 are connected at their upper ends to the top of the casing and at their lower ends with offstanding lugs on the keys 29 and 29', said springs normally tending to raise the keys. The primary function of the springs 248 is to return the keys to their normal positions when the adding section of the machine is detached from the paying section, under which conditions the springs 26' have no co-operation with the said keys. A coin cup 2' is associated with the chute 2, as shown in Figure 1, but its detail construction is not described herein, because said cup forms the subject matter of a separate application for patent.

Having thus described the invention, what is claimed as new is:

1. In a mechanical cashier, the combination of money holders, ejectors associated therewith, means normally connected with the ejectors for operating the same, an actuator also including an ejector operating mechanism, and means for disconnecting the ejectors from the first mentioned operating means, and connecting them with the ejector operating mechanism of the actuator.

2. In a mechanical cashier, the combination of money holders, ejectors associated therewith, manually operable devices normally connected with the ejectors to actuate the same, an actuator including an ejector bar common to said ejectors, and means for rendering the ejectors inoperative in respect to the manually operable devices aforesaid and operative in respect to the ejector bar.

3. In a mechanical cashier, the combination of money holders, ejectors therefor, separate manually operable devices for the ejectors, each normally connected with an ejector for operation thereof, an actuator common to said ejectors, and means for selectively connecting one or more of the ejectors with the actuator and simultaneously disconnecting said ejectors from the manually operable devices first mentioned.

4. In a mechanical cashier, the combination of money holders, ejectors associated therewith, manually operable devices arranged to coact with the ejectors for separate actuation of the same, an actuator common to the ejectors, and means for connecting the ejectors operatively with either the manually operable devices or the said actuator.

5. In a mechanical cashier, the combination of money holders, ejectors associated therewith, ejector levers normally interlocking with the ejectors, key means to actuate said levers, an actuator, a shaft connected with the actuator, a bar connected to the shaft for rocking movement thereby and adapted to independently or collectively operate one or more of the ejectors, and means adapted to operatively connect the ejectors with either the ejector levers or said bar.

6. In a mechanical cashier, the combination of money holders, longitudinally movable ejectors associated therewith, ejector levers normally having interlocking connection with said ejectors, keys connected to said levers for operation of the same, an ejector bar extending transversely of all of the ejectors, means for rocking said bar, and selector mechanism capable of selectively connecting the ejectors with said bar.

7. In a mechanical cashier, the combination of money holders, ejectors therefor, an ejector shaft, an ejector bar rockable with said shaft and common to said ejectors, ejector levers loosely mounted on the shaft and capable of operating the ejectors, separate devices for actuating said levers, and means adapted to control the operative connection between the ejectors and ejector bar and operating levers whereby the ejectors may be operated by the bar or the separate devices which actuate the levers.

8. In a mechanical cashier, a coin receptacle, an ejector therefor, means for operating the ejector, a signal, a plunger movable with the ejector and adapted to be retracted by engagement with coins in the receptacle to prevent operation of the signal, and means for operating the signal when said plunger is not retracted by the coins in the receptacle.

9. In a mechanical cashier, the combination of a coin receptacle, an ejector therefor, means for operating the ejector, a plunger carried by the ejector and adapted to enter the receptacle, a spring for moving said plunger into the receptacle, and means for operating the signal operable by the plunger as the same is withdrawn from the receptacle with the ejector.

10. In a mechanical cashier, the combination of a receptacle, an ejector therefor, a plunger controlled by said ejector and movable in a path intersecting the receptacle but normally prevented from entering the receptacle by the coins therein, a spring for holding said plunger in a predetermined position, a signal, a member for operating the signal, and means on the plunger to actuate said member at a predetermined point in the movement of the plunger.

11. In a mechanical cashier, the combination of a coin receptacle, an ejector therefor, a replenishing signal for the receptacle comprising a plunger controlled by the ejector and normally prevented from entering the receptacle by the coins therein, a signal, a member for operating the signal, and a dog on the plunger to actuate said member on abnormal movement of the plunger.

12. In a mechanical cashier, the combination of a coin receptacle, an ejector therefor, a superposed plunger on said ejector and adapted to be impinged with coins in the receptacle in the normal movement of the ejector and to enter said receptacle under abnormal conditions, namely, when no coins are in the path of movement of said plunger, and a signal adapted to be operated by reason of said abnormal movement of the plunger.

13. In a mechanical cashier, the combination of coin receptacles, ejectors therefor, a coin replenishing signal for said receptacles, an operating member for said signal including a bail common to the several ejectors, and plungers associated with the ejectors and operatively controlled to actuate said bail when the quantity of coins in the receptacle is diminished a predetermined extent.

14. In a mechanical cashier, the combination of coin receptacles, ejectors therefor, a coin replenishing signal for said receptacles, an operating member for said signal including a bail common to the several ejectors, plungers superposed in respect to and carried by the ejectors, means for normally holding said plungers in a predetermined position so that they are adapted to yieldingly impinge with coins in the receptacle in the normal movement of the ejectors, and means on said plungers adapted to engage the bail aforesaid to operate the signal when the quantity of coins in a receptacle is diminished so that the plunger or plungers do not engage therewith.

15. In combination, a coin receptacle, an ejector having a coin engaging portion at its outer end, resiliently mounted devices engaging the ejector to cause the coin engaging portion to engage and eject the lowermost coin in the receptacle on outward movement of said ejector, and a cam to vary the resilient action of one of said devices to cause the ejector to operate free of the remaining coins in the receptacle on the ejector return movement.

16. In combination, a coin receptacle, an ejector having a coin engaging portion at its outer end, resiliently mounted devices engaging the ejector to cause the coin engaging portion to engage and eject the lowermost coin in the receptacle on outward movement of said ejector, a guide at the base of the receptacle to receive the coin engaging portion aforesaid, and means to vary the resilient action of one of said devices to cause the said coin engaging portion to enter said guide to allow the ejector to operate free of the remaining coins in the receptacle on the ejector return movement.

17. In a mechanical cashier, a coin receptacle, an ejector, optionally operable means for controlling an operation of the ejector, a signal, a member movable with the ejector which is adapted to be retracted by engagement with coins in the receptacle to prevent operation of the signal, and coin controlled means for causing an operation of the signal when said member is constrained against movement.

18. In combination, money ejecting devices, selecting devices controlling the operation thereof, accumulating devices, keys for controlling the ejecting devices and accumulating devices through certain of said selecting devices, an operating member for operating said devices, other keys for controlling the ejecting devices only through certain of said selecting devices, and a third group of keys for operating the ejecting devices directly.

In testimony whereof we affix our signatures.

NELSON WHITE.
WILLIAM S. OVERLIN.
FRANK A. BULLINGTON.